(12) United States Patent
Kim et al.

(10) Patent No.: US 10,638,041 B2
(45) Date of Patent: Apr. 28, 2020

(54) MOBILE TERMINAL AND METHOD FOR CONTROLLING THE SAME AND OPERATING IN AN ALWAYS ON CAMERA MODE

(71) Applicant: LG ELECTRONICS INC., Seoul (KR)

(72) Inventors: Younghan Kim, Seoul (KR); Hyunju Oh, Seoul (KR); Jaeho Kwak, Seoul (KR); Jaehwan Park, Seoul (KR); Sanghyun Jung, Seoul (KR); Jahee Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/105,439

(22) Filed: Aug. 20, 2018

(65) Prior Publication Data

US 2019/0058834 A1 Feb. 21, 2019

(30) Foreign Application Priority Data

Aug. 18, 2017 (KR) .................. 10-2017-0105007

(51) Int. Cl.
| | |
|---|---|
| *H04N 5/232* | (2006.01) |
| *G06F 3/01* | (2006.01) |
| *G06F 1/32* | (2019.01) |
| *G06F 3/0354* | (2013.01) |
| *G06F 3/038* | (2013.01) |

(Continued)

(52) U.S. Cl.
CPC ..... *H04N 5/232411* (2018.08); *G06F 1/3215* (2013.01); *G06F 1/3231* (2013.01); *G06F 1/3278* (2013.01); *G06F 3/017* (2013.01); *G06F 3/038* (2013.01); *G06F 3/03547* (2013.01); *H04N 5/232* (2013.01); *H04N 5/23216* (2013.01); *H04N 5/23219* (2013.01); *H04N 5/23222* (2013.01); *H04N 5/23241* (2013.01); *H04N 5/23245* (2013.01); *H04N 5/23296* (2013.01); *H04N 5/232935* (2018.08); *H04N 7/18* (2013.01); *G06F 3/0482* (2013.01); *G06F 3/0488* (2013.01)

(58) Field of Classification Search
CPC .............................................. H04N 5/232411
See application file for complete search history.

(56) References Cited

U.S. PATENT DOCUMENTS

| | | | |
|---|---|---|---|
| 2003/0169342 A1* | 9/2003 | Steinberg | ................. H04N 1/00 348/207.1 |
| 2007/0026889 A1* | 2/2007 | Yamauchi | ......... H04M 1/72536 455/552.1 |

(Continued)

*Primary Examiner* — Cynthia Segura
(74) *Attorney, Agent, or Firm* — Birch, Stewart, Kolasch & Birch, LLP

(57) ABSTRACT

A mobile terminal and a method for controlling the mobile terminal are disclosed. A mobile terminal according to the present invention comprises a camera, a touch screen, and a controller configured to enter Always on Camera mode in which the camera is operated while the touch screen is inactive, take a picture at predetermined photographing intervals, and take more pictures each time the number of recognized subjects is changed within one photographing period. According to the present invention, a mobile terminal may take an image reflecting a change of a subject in Always on Camera mode in an efficient manner.

10 Claims, 32 Drawing Sheets

(51) Int. Cl.
*H04N 7/18* (2006.01)
*G06F 1/3234* (2019.01)
*G06F 1/3215* (2019.01)
*G06F 1/3231* (2019.01)
*G06F 3/0482* (2013.01)
*G06F 3/0488* (2013.01)

(56) References Cited

U.S. PATENT DOCUMENTS

| | | | |
|---|---|---|---|
| 2008/0220809 A1* | 9/2008 | Hansen | G03B 9/64 |
| | | | 455/550.1 |
| 2014/0063319 A1* | 3/2014 | Miyata | H04N 5/23219 |
| | | | 348/333.03 |
| 2014/0085495 A1* | 3/2014 | Almalki | H04N 5/23245 |
| | | | 348/208.6 |
| 2015/0350551 A1* | 12/2015 | Harris | H04N 5/23216 |
| | | | 348/231.99 |
| 2019/0037135 A1* | 1/2019 | Hedge | H04N 5/23229 |

* cited by examiner

MOBILE TERMINAL AND METHOD FOR CONTROLLING THE SAME AND OPERATING IN AN ALWAYS ON CAMERA MODE

CROSS-REFERENCE TO RELATED APPLICATIONS

Pursuant to 35 U.S.C § 119(a), this application claims the benefit of earlier filing date and right of priority to Korean Patent Application No. 10-2017-0105007 filed on Aug. 18, 2017, the contents of which are hereby incorporated by reference in its entirety.

BACKGROUND OF THE INVENTION

Field of the Invention

The present invention relates to a mobile terminal which enables a user to take a picture with more improved user convenience and a method for controlling the mobile terminal.

Related Art

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, the number of cases where people take pictures or shoot a video with their camera over a long time period is increasing and under this situation, needs are growing for people to take pictures in natural composition while reducing power consumption of the mobile terminal.

SUMMARY OF THE INVENTION

Accordingly, an object of the present invention is to address the above-noted and other problems.

An object of the present invention is to provide a mobile terminal providing a user interface by which a user can control the mobile terminal easily and efficiently and a method of controlling the same.

An object of the present invention is to solve the aforementioned problem and other problems. Another object of the present invention is to provide a mobile terminal which enables a user to efficiently take a picture which reflects a change of a subject while the mobile terminal is operating in Always on Camera mode and a method for controlling the mobile terminal.

According to one aspect of the present invention to achieve the aforementioned and other object, a mobile terminal is provided, the mobile terminal including a camera; a touch screen; and a controller which enters Always on Camera mode in which the camera is operated while the touch screen is inactive and takes a picture at predetermined photographing intervals and takes more pictures each time the number of recognized subjects is changed within one photographing period.

The controller sets the number of recognized subjects in an image as an index, initializes the index each time the one period is started, and takes more pictures when the number of recognized subjects within the one period is changed and the index is increased.

The mobile terminal may further include a user input unit, and the controller, when a predetermined input is received through the user input unit, may activate a screen of the touch screen and display an image obtained through the camera on the screen as a preview image.

The mobile terminal may further include a sensing unit sensing motion of the mobile terminal, and the controller, when a predetermined input is received while the mobile terminal is stationary, may enter the Always on Camera mode and when motion of the mobile terminal is detected, may stop the Always on Camera mode.

The mobile terminal may further include an optical output unit, and the controller, when the mobile terminal enters the Always on Camera mode, may display a predetermined color indicating that the mobile terminal is operating in the Always on Camera mode through the optical output unit.

The controller may take a predetermined number of pictures continuously at one time and select an image exhibiting the least shaky motion from among the pictures taken by the predetermined number of times.

The mobile terminal may further include a memory, and the controller may compare the selected image with an image selected from among those obtained before the selected image is taken and if the two images are different from each other, store the selected image in a dedicated area of the memory.

When a predetermined gesture is detected, the controller may activate the screen, display a preview image obtained through the camera on the screen, photograph an image after a predetermined time period is passed, and deactivate the screen again.

The controller may output an alarm indicating that the mobile terminal may operate in the Always on Camera mode on the basis of a position of the mobile terminal and a photographing pattern of the user.

The mobile terminal may further include a memory storing a plurality of images taken by the user, and the controller may recognize subjects within the plurality of images, calculate an average value of composition of subjects within the plurality of images, and store the average value in a database in the memory.

The controller may recognize subjects within an image photographed in the Always on Camera mode, obtain composition of the subjects within the photographed image, and recommend the photographed image in the order of how much the obtained composition matches the average value of the database.

The controller may store an image selected among the recommended images in a dedicated area of the memory and update the average value of the database by reflecting composition of subjects within the selected image.

Also, according to another aspect of the present invention, a method for controlling a mobile terminal is provided, the method including entering Always on Camera mode in which a camera is operated while a touch screen is inactive, taking an image at predetermined photographing intervals, and taking more images each time the number of recognized subjects is changed within one period.

A mobile terminal according to the present invention and a method for controlling the mobile terminal provide advantageous effects as follows.

According to at least one of embodiments of the present invention, while a mobile terminal is operating in Always on Camera mode, the mobile terminal may take an image which reflects a change of a subject in an efficient manner.

Also, according to at least one of embodiments of the present invention, a mobile terminal may take an image when a new subject is added during a photographing period.

Also, according to at least one of embodiments of the present invention, power consumption of a mobile terminal may be reduced even for long-time photographing by deactivating a touch screen in the Always on Camera mode.

Also, according to at least one of embodiments of the present invention, when another event occurs while the mobile terminal is operating in the Always on Camera mode, the mobile terminal may readily return to the Always on Camera mode.

Also, according to at least one of embodiments of the present invention, even when the touch screen is inactive, it may be easily checked through the output from an optical output unit that a mobile terminal is operating in the Always on Camera mode.

Also, according to at least one of embodiments of the present invention, clear images may be photographed even when subjects move at the time of photographing.

Also, according to at least one of embodiments of the present invention, a memory may be utilized in an efficient manner, and overuse of the memory may be prevented.

Also, according to at least one of embodiments of the present invention, desired images may be photographed conveniently by using a simple gesture even in the Always on Camera mode.

Also, according to at least one of embodiments of the present invention, recommendations for places appropriate for taking photographs in the Always on Camera mode may be made conveniently.

Also, according to at least one of embodiments of the present invention, an image suitable for a user among images photographed in the Always on Camera mode may be recommended conveniently on the basis of a database of composition of subjects within images.

Also, according to at least one of embodiments of the present invention, user preferences for images photographed in the Always on Camera mode may be easily reflected in the database.

The additional scope of applicability of the present invention may be clearly understood from detailed descriptions given below. However, since various modifications and changes that may be made within the technical spirit and scope of the present invention may be clearly understood by those skilled in the art, detailed descriptions and specific embodiments such as preferred embodiments of the present invention should be understood to have been given for illustrative purposes only.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

With the mobile terminal and the method of controlling the same according to the present invention, the following effects are obtained.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
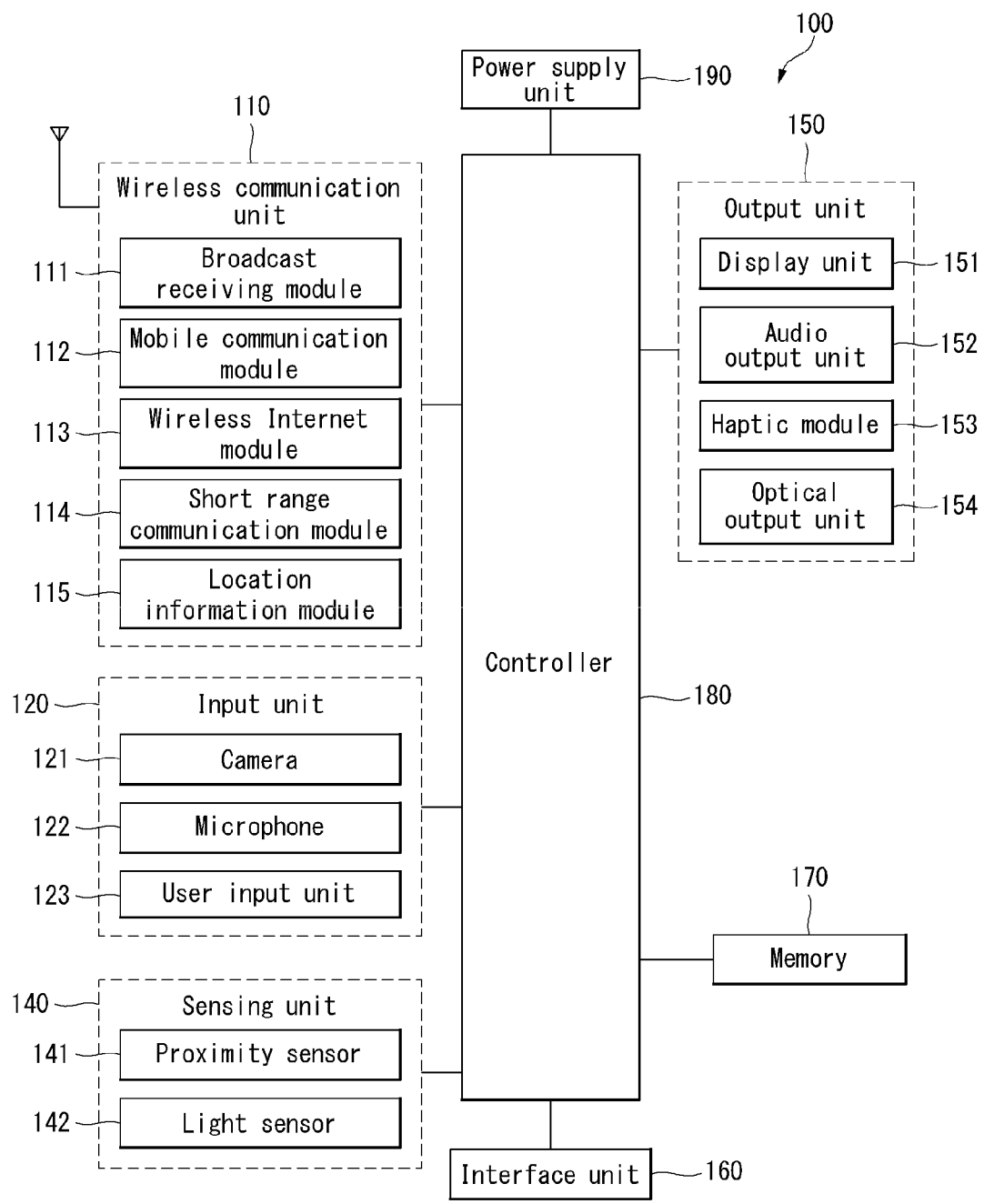
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as proximity sensor (141), illumination sensor (142), a touch sensor, an acceleration sensor (144), a magnetic sensor, a G-sensor, a gyroscope sensor (143), a motion sensor, an RGB sensor, an infrared (IR) sensor, a force sensor (145), a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In what follows, a control method which may be implemented in a mobile terminal constructed as described above and related embodiments will be described with reference to appended drawings. It should be clearly understood by those skilled in the art that the present invention may be embodied in other specific forms without departing the spirit and essential characteristics of the present invention.

Figure 2:
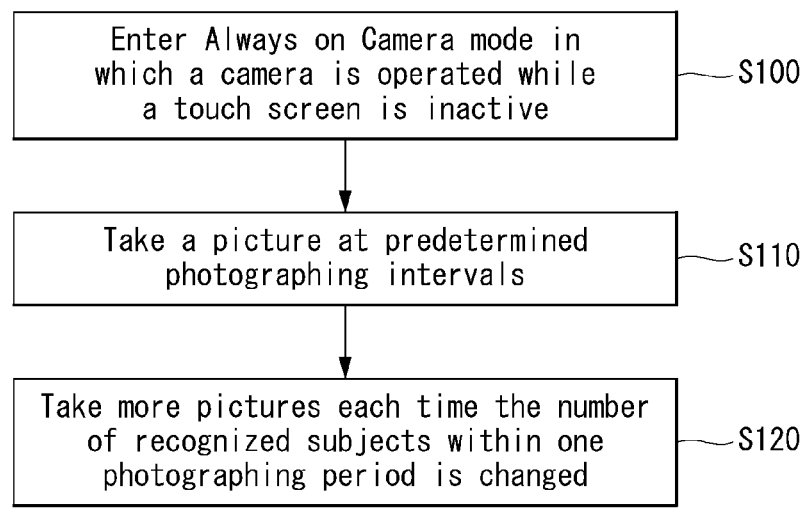
FIG. 2 illustrates a flow diagram of a method for controlling a mobile terminal according to one embodiment of the present invention.
Figure 3:
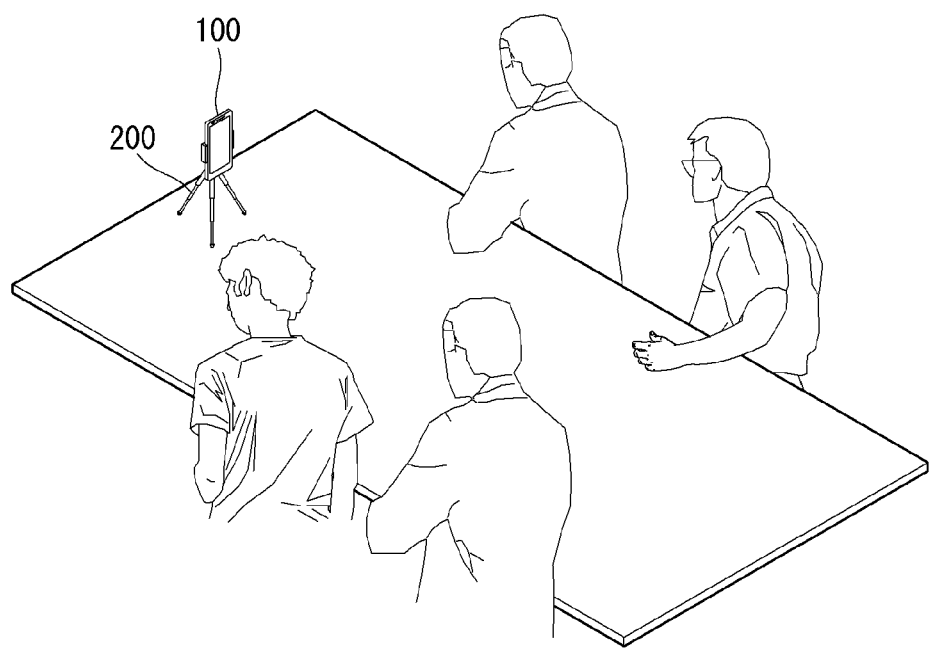
FIGS. 3 to 5 illustrate photographing in Always on Camera mode according to one embodiment of the present invention.
Figure 4:
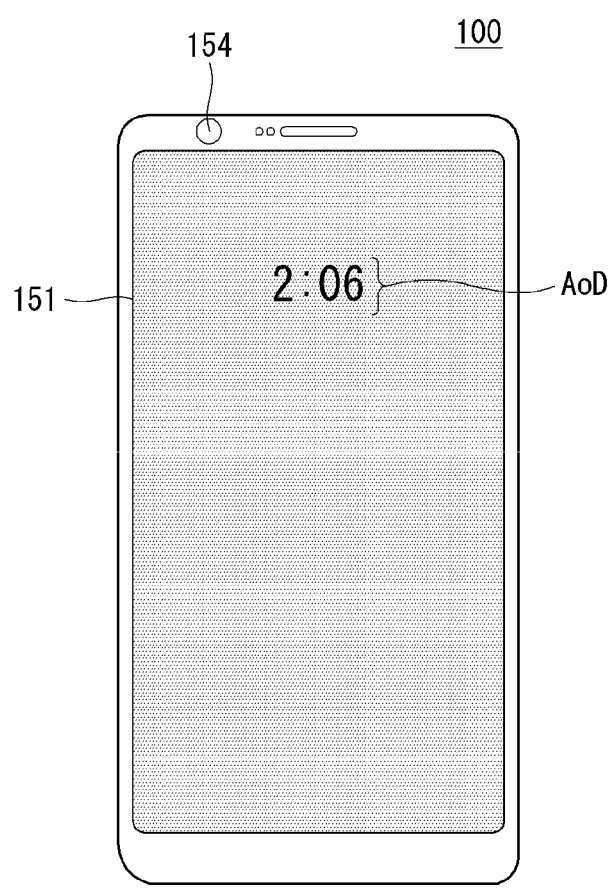
Figure 5:
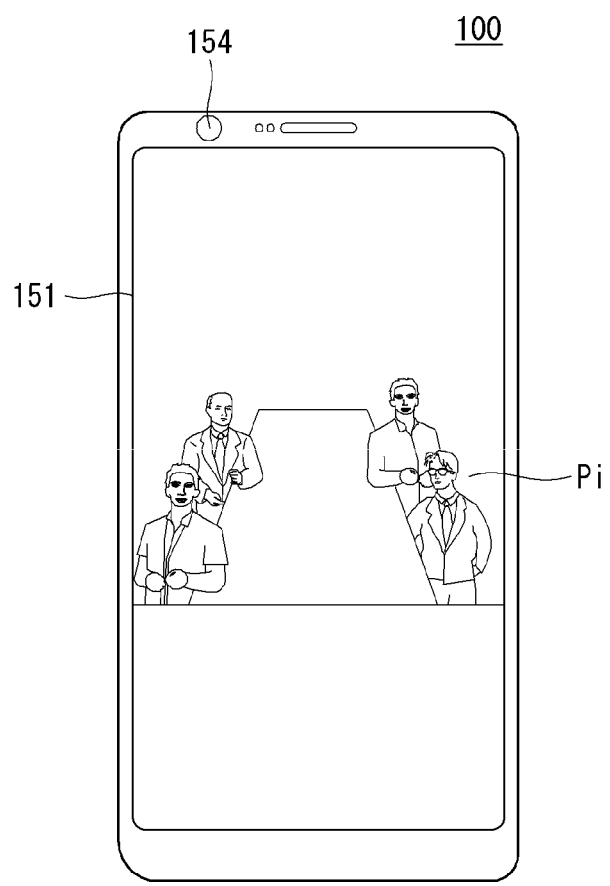

FIG. 2 illustrates a flow diagram of a method for controlling a mobile terminal according to one embodiment of the present invention. FIGS. 3 to 5 illustrate photographing in Always on Camera mode according to one embodiment of the present invention.

A method for controlling a mobile terminal according to one embodiment of the present invention may be implemented in the mobile terminal 100 described with reference to FIG. 1. In what follows, with reference to related drawings, a method for controlling a mobile terminal according to one embodiment of the present invention and an operation of the mobile terminal 100 for implementing the method will be described in detail.

Referring to FIG. 2, the controller 180 may enter Always on Camera (AoC) mode in which a camera is operated while a touch screen is inactive S100.

Referring to FIG. 3, the mobile terminal 100 may be disposed such that the mobile terminal is mounted onto a cradle 200 on a table to take a picture. In general, when the camera 121 is operated, an image photographed through the camera 121 may be displayed on a touch screen 151 in the form of a preview image. However, in the case of a meeting lasting long hours, power of the mobile terminal may be consumed too much, and attendees to the meeting may be distracted by preview images.

According to one embodiment of the present invention, the aforementioned problem may be solved when the camera 121 is operated in the Always on Camera mode. The Always on Camera mode may refer to an operating mode of the mobile terminal 100 in which the mobile terminal 100 operates the camera 121 to take a picture periodically or all the time. According to one embodiment, the Always on Camera mode may be performed while the touch screen 151 is inactive. In other words, different from a normal use case, in the Always on Camera mode, a preview image obtained through the camera 121 may not be displayed on the touch screen 151.

Also, according to one embodiment, the Always on Camera mode may be operated in an Always on Display state. As shown in FIG. 4, the Always on Display mode may refer to a state in which Always on Display (AoD) information is always displayed on a portion of the touch screen 151 while the mobile terminal 100 is in a sleep mode.

When a display panel of the mobile terminal 100 is made of LCD, the Always on Display may apply power to the whole display panel but display an image showing information only on a portion thereof. Also, when the display panel is made of OLED, power may be applied only to a portion of the display panel for displaying information. However, the descriptions above are only one embodiment; therefore, the present invention is not limited to a specific method as long as the Always on Display state is implemented.

When the mobile terminal 100 operates in the Always on Camera mode while being in the Always on Display state, an image may be obtained through the camera 121. The image acquisition may be performed at predetermined intervals or all the time. When a predetermined input is received through a user input unit 123 while the mobile terminal is in the Always on Display state, the controller 180 may activate the touch screen 151. As shown in FIG. 5, the controller 180 may display an image obtained through the camera 121 on the touch screen 151 as a preview image Pi.

When a separate input is not applied for a predetermined time period while the preview image Pi is displayed, the mobile terminal 100 may switch back to the Always on Display state as shown in FIG. 4. Irrespective of whether the mobile terminal 100 is in a sleep mode or whether the touch screen 151 is activated, the controller 180 may maintain the Always on Camera mode continuously.

Again, referring to FIG. 2, the controller 180 may photograph an image at predetermined photographing intervals S110.

According to one embodiment, in the Always on Camera mode, the controller 180 may operate the camera 121 so that images are always taken. According to another embodiment, the controller 180 may operate the camera 121 so that images are taken for a predetermined time period from a start point of a photographing period and after image are taken, may not operate the camera 121 until the start point of the next photographing period.

The controller may take an image obtained through the camera 121 according to a photographing period set in the Always on Camera mode. For example, when the photographing period is set to 30 seconds, the controller 180 may take an image obtained through the camera every 30 seconds. The photographed images may be temporarily stored or may be stored in a dedicated area of the memory 170 according to the user input, which will be described again with reference to related drawings.

The photographed image may be a photograph or a video. According to one embodiment, the photographing period for a photograph and that for a video may be set differently from each other. For example, in the case of a photograph, the period may be set to 30 seconds while, in the case of a video, it may be set to 90 seconds. However, this is only an example; the present invention is not limited to the specific example, and the photographing period may be set in various time lengths.

When a video is shot, it may be taken over predetermined duration for each period. For example, when the period for video shooting is set to 90 seconds, the controller 180 may be configured to take a video for 5 seconds from the start of the period. However, this is only one example; the present invention is not limited to the specific example, and the duration of the video shooting may be set in various time lengths.

Again, referring to FIG. 2, the controller 180 may take more images each time the number of subjects recognized within one period is changed S120.

According to one embodiment, the controller 180 may recognize a subject to be photographed. The controller 180 may recognize a subject in an image photographed through the camera 121. For example, if the subject is a person, the controller 180 may recognize the face of the subject by using a face recognition algorithm such as feature extraction. The recognition algorithm for a subject within an image is not limited to a specific method, and various methods may be applied once they may be used for recognizing a subject.

When the number of subjects recognized within one photographing period is changed, the controller 180 may take an image through the camera 121 irrespective of a photographing period. For example, suppose the number of persons within an image photographed through the camera 121 is one at the start of a photographing period, and another person gets into the field of view of the camera 121 before the start of the next photographing period.

In this case, the controller 180 may recognize the new person within the image by using a recognition algorithm. When the new person is recognized, the controller 180 may take an image photographed through the camera 121. According to one embodiment, the controller 180 may take an image by focusing on the new person. For example, auto-zoom photographing may be performed, which take a picture by zooming-in the new person recognized within the image.

According to the description above, even when a touch screen of a mobile terminal is inactive or the mobile terminal is in the Always on Display state, images may be taken according to the Always on Camera mode automatically and periodically. Also, an image is taken irrespective of the photographing period when a subject in the image is changed, thereby obtaining a picture reflecting the change of the subject within the photographing period.

In what follows, with respect to the descriptions given above, an operation of the mobile terminal 100 in the Always on Camera mode will be described in detail with reference to related drawings.

Figure 6:
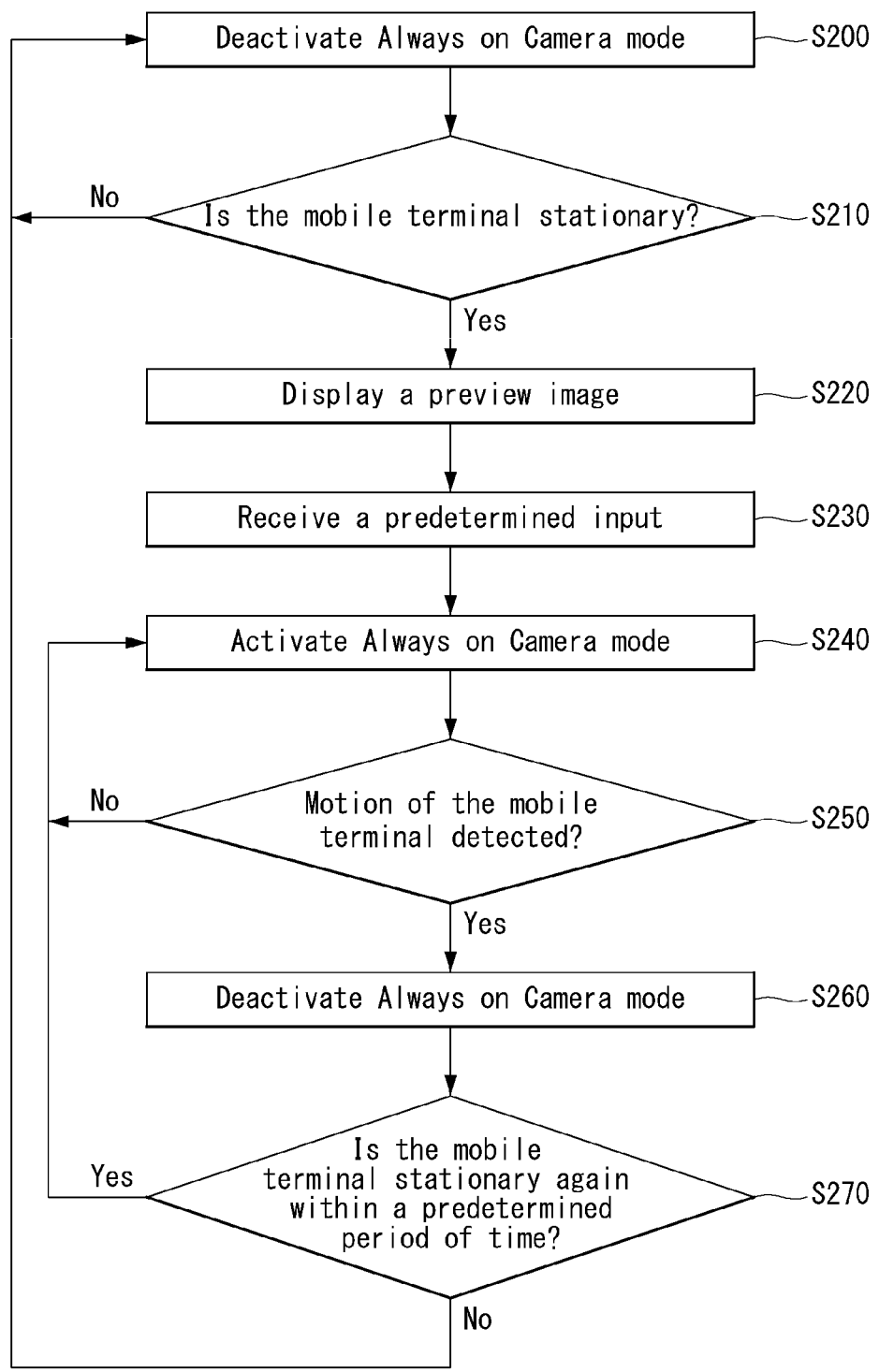
FIG. 6 illustrates a flow diagram of a method for activating Always on Camera mode according to one embodiment of the present invention.

FIG. 6 illustrates a flow diagram of a method for activating Always on Camera mode according to one embodiment of the present invention. FIGS. 7 to 10 illustrate activating Always on Camera mode according to one embodiment of the present invention.

A method for activating Always on Camera mode according to one embodiment of the present invention may be implemented in the mobile terminal 100 described with reference to FIG. 1. In what follows, with reference to related drawings, a method for activating Always on Camera mode according to one embodiment of the present invention and an operation of the mobile terminal 100 to implement the method will be described in detail.

Referring to FIG. 6, while Always on Camera mode is deactivated S200, the controller 180 may detect whether the mobile terminal 100 is stationary through the sensing unit 140, S210.

The sensing unit 140 may include various sensors capable of sensing motion of the mobile terminal 100, such as an accelerometer, magnetic sensor, gravity sensor, and gyroscope. By using sensors included in the sensing unit 140, the controller 180 may determine whether the mobile terminal 100 is stationary.

Figure 7:
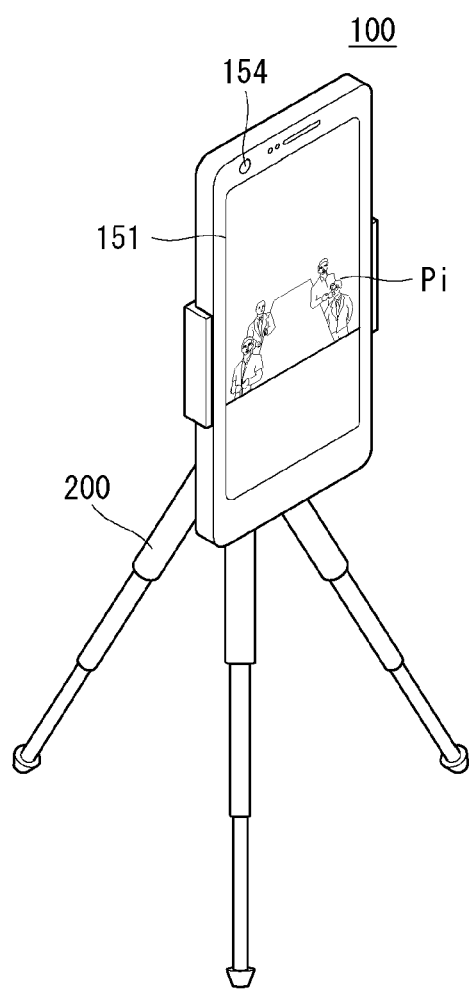
FIGS. 7 to 10 illustrate activating Always on Camera mode according to one embodiment of the present invention.

Similarly, as shown in FIG. 7, the mobile terminal 100 may be mounted to a cradle 200. According to one embodiment, an interface, which outputs a signal notifying that the mobile terminal 100 has been mounted onto the cradle 200, may be included in the mobile terminal 100. Or the mobile terminal 100 may receive a signal, which notifies that the mobile terminal 100 has been mounted onto the cradle 200, from the cradle 200 through the wireless communication unit 110.

Again, referring to FIG. 6, when the mobile terminal 100 is stationary S210, Yes, the controller 180 may display an image photographed through the camera 121 as a preview image Pi on the touch screen 151 as shown in FIG. 7, S220.

Figure 8A:
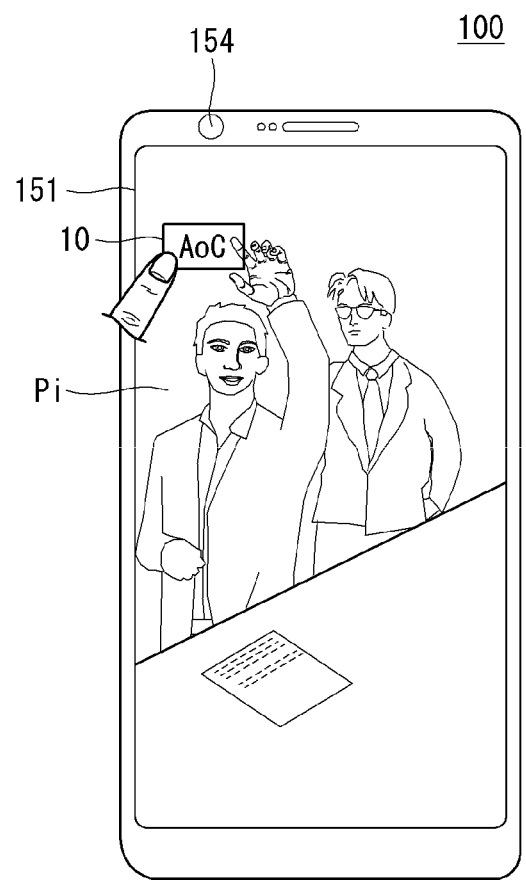

As shown in FIG. 8a, the controller 180 may display an image obtained from the camera 121 on the touch screen 121 as a preview image Pi. When the mobile terminal 100 is stationary, the controller 180 may display a button 10 in one area of the touch screen 151, which enables the mobile terminal 100 to enter the Always on Camera mode upon being touched.

Again, referring to FIG. 6, when a predetermined input is received S230, the controller 180 may enter the Always on Camera mode S240.

Figure 8B:
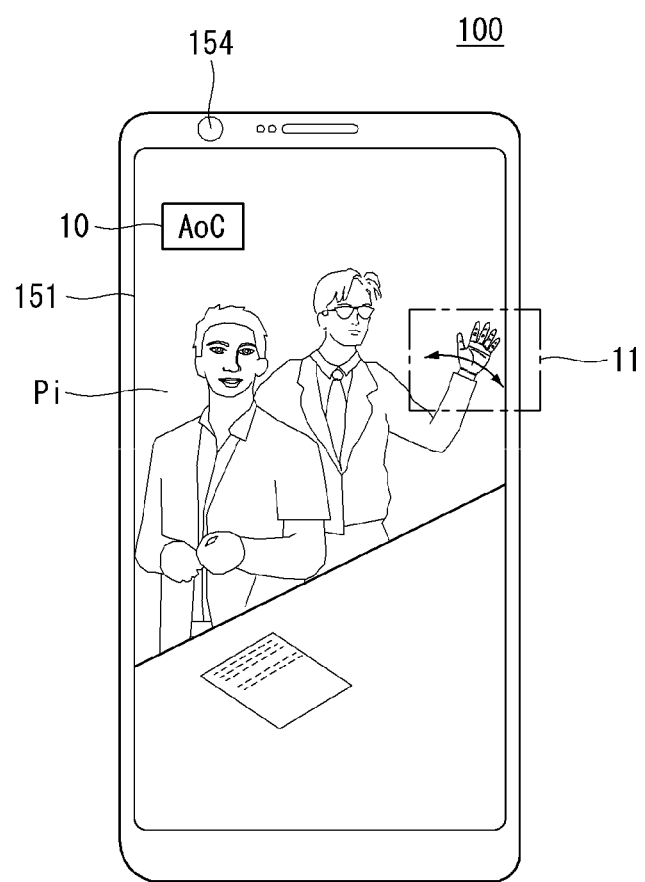

According to one embodiment, as shown in FIG. 8a, the predetermined input may be a touch input for selecting the button 10 displayed on the touch screen 151. Similarly, as shown in FIG. 8b, the predetermined input may be a specific gesture such as the user's waving motion. In this case, a Time of Flight (ToF) sensor or other motion sensor capable of detecting the user's gesture may be included in the mobile terminal 100.

However, it should be noted that the aforementioned case is only one example, and the present invention is not limited to the specific example. The predetermined input may be the user's voice or a specific touch input on the touch screen 151.

Figure 9A:
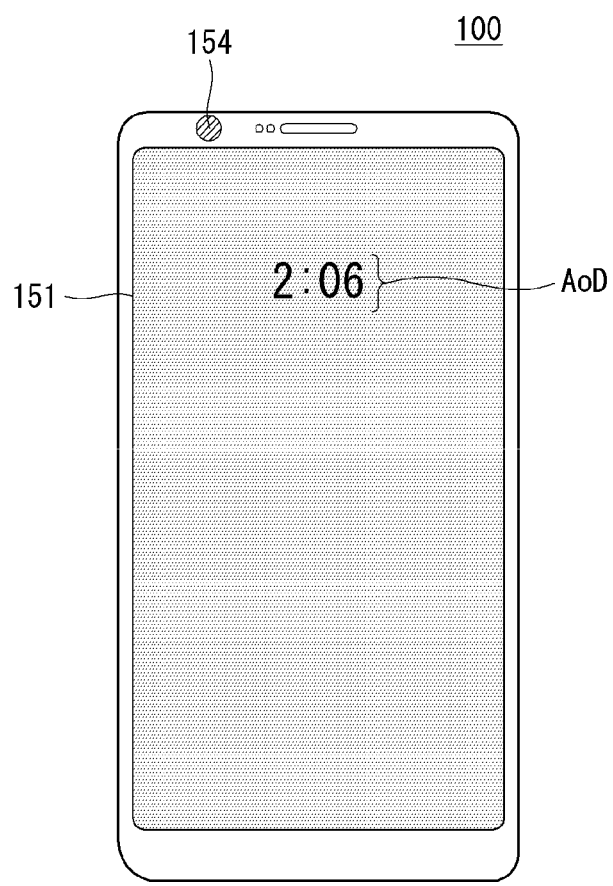

As shown in FIG. 9a, when the predetermined input is received, the controller 180 may execute the Always on Camera mode and display Always on Display (AoD) information on the touch screen 151. However, the aforementioned operation is only one example, and as described above, the touch screen 151 may be deactivated. According to the photographing period, the controller 180 may take a picture from the image photographed through the camera 121.

Referring to FIG. 9a, an optical output unit 154 may be installed in one area of the mobile terminal 100. Through the optical output unit 154, the controller 180 may output a predetermined color indicating that the mobile terminal 100 is operating in Always on Camera mode. According to the operation, even when the touch screen 151 is inactive, the user may easily check through the output of the optical output unit 154 that the mobile terminal 100 is operating in Always on Camera mode.

Figure 9B:
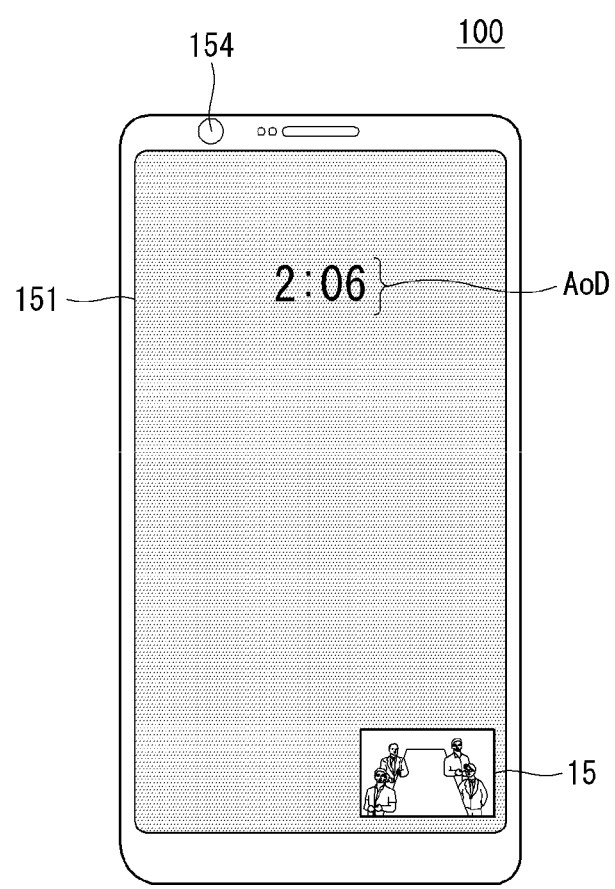

Referring to FIG. 9b, according to another embodiment, the controller 180 may display an image obtained from the camera in one portion of the touch screen 151 together with the Always on Display (AoD) information. In this case, the image 15 may be displayed with lower brightness than the brightness applied for those images displayed in the mobile terminal 100 under a typical situation. According to the aforementioned operation, the user may easily check through the image 15 that the mobile terminal 100 is operating in Always on Camera mode.

Again, referring to FIG. 6, the controller 180 detect motion of the mobile terminal 100 through the sensing unit 140, S250. When motion of the mobile terminal 100 is detected S250, Yes, the controller 180 may stop the Always on Camera mode S260.

Figure 10:
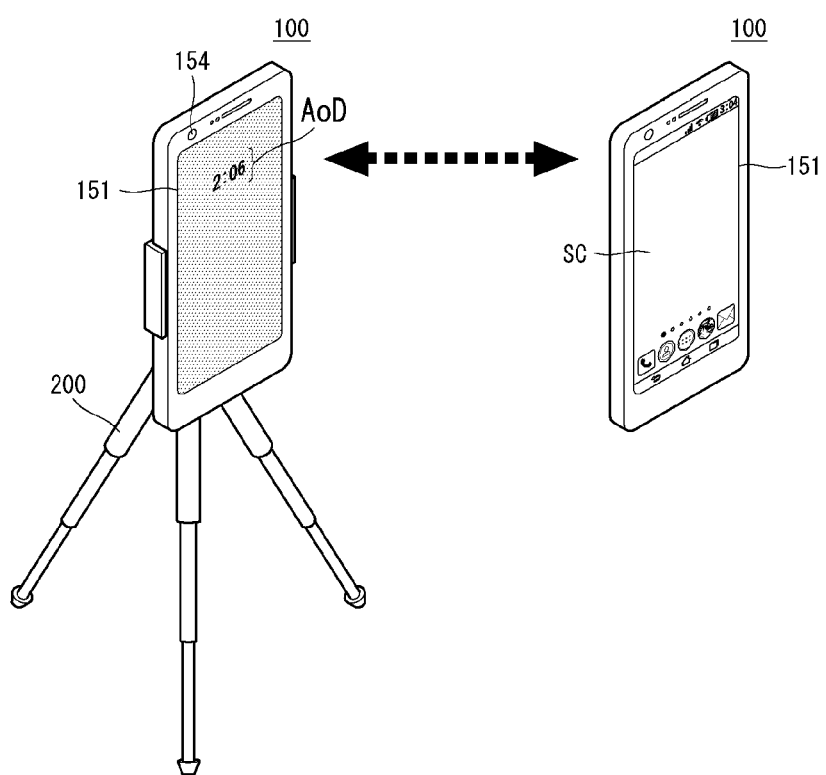

As shown in FIG. 10, while the mobile terminal 100 is operating in the Always on Camera mode, an event that the user manipulates the mobile terminal 100 (for example, checking a received message) may occur. If a predetermined input is received through the user input unit, the controller 180 may activate the touch screen 151 and display a screen SC for performing a function due to the event.

When the mobile terminal 100 moves according to the occurrence of the event, the controller 180 may stop taking a picture in the Always on Camera mode. Accordingly, an unwanted image may be prevented from being taken by the camera 121 due to motion of the mobile terminal 100.

Along with the operation above, the controller 180 may either stop outputting the output of the optical output unit 154 described with reference to FIG. 9a or stop displaying the image 15 described with reference to FIG. 9b.

Although FIG. 6 illustrates the case in which the mobile terminal 100 moves, the present invention is not limited to the specific case. When a predetermined touch input is applied to the touch screen 151 or a predetermined gesture of the user is detected, the controller 180 may stop the Always on Camera mode.

Again, with reference to FIG. 6, the controller 180 may detect through the sensing unit 140 whether the mobile terminal 100 is fixed again within a predetermined period of time S270. When the mobile terminal 100 is gain mounted onto a cradle 200 S270, Yes, the controller 180 may activate the Always on Camera mode again.

After the event, the mobile terminal 100 may be mounted onto the cradle 200 again. The controller 180 may check the time passed since the mobile terminal starts to move until the mobile terminal is fixed again. When the checked time is within a predetermined time period, the controller 180 may resume the stopped Always on Camera mode.

Here, resumption of the Always on Camera mode may indicate maintaining of continuity to the photographing period and photographed images before the Always on Camera mode is stopped. In other words, the photographing period is resumed to that before the Always on Camera mode is stopped and photographed images may be grouped to the same category.

Accordingly, by deactivating the touch screen 151 in the Always on Camera mode, power consumption of a mobile terminal may be reduced even for long-time photographing. Also, even when another event occurs in the middle of operation in Always on Camera mode, the mobile terminal may return to the Always on Camera mode conveniently.

Figure 11:
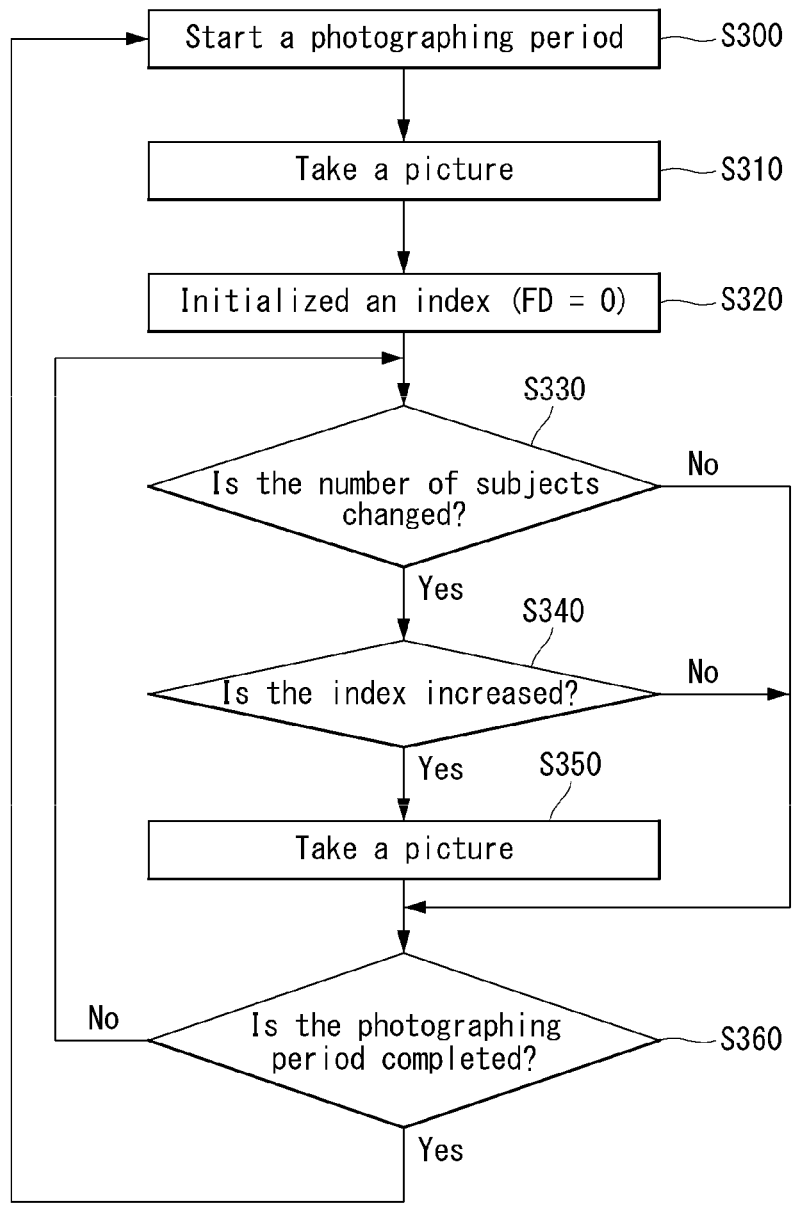
FIG. 11 is a flow diagram of a method for taking an image in the Always on Camera mode according to the one embodiment of the present invention.
Figure 12:
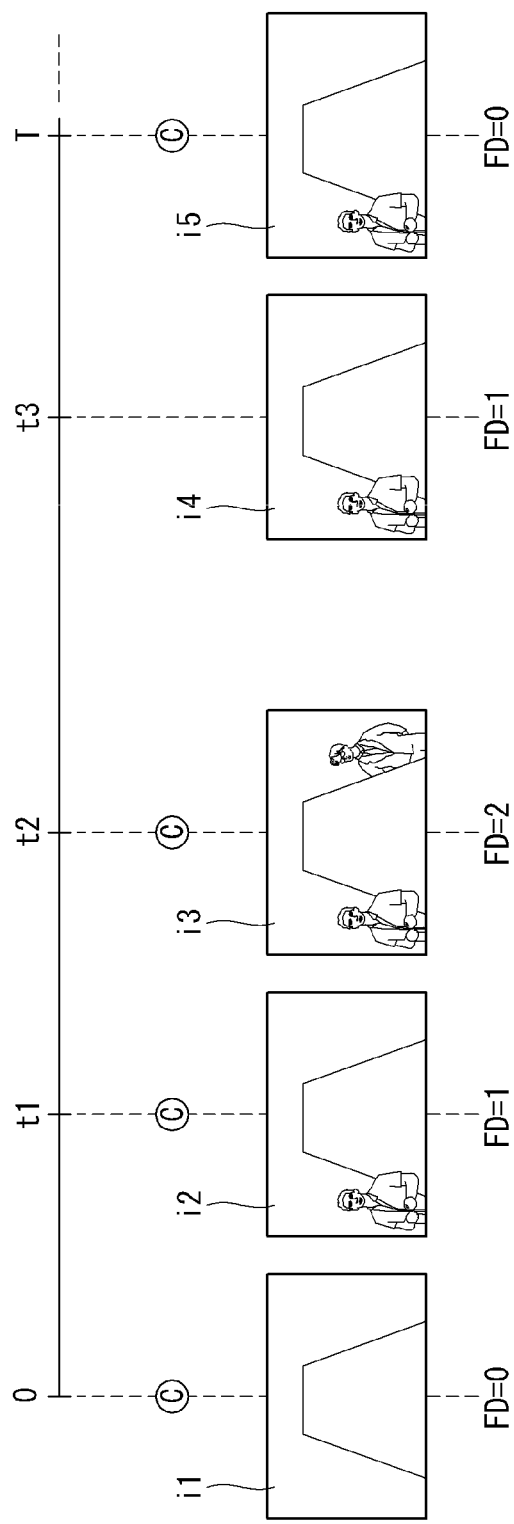
FIGS. 12 to 14 illustrate taking an image in the Always on Camera mode according to one embodiment of the present invention.
Figure 13:
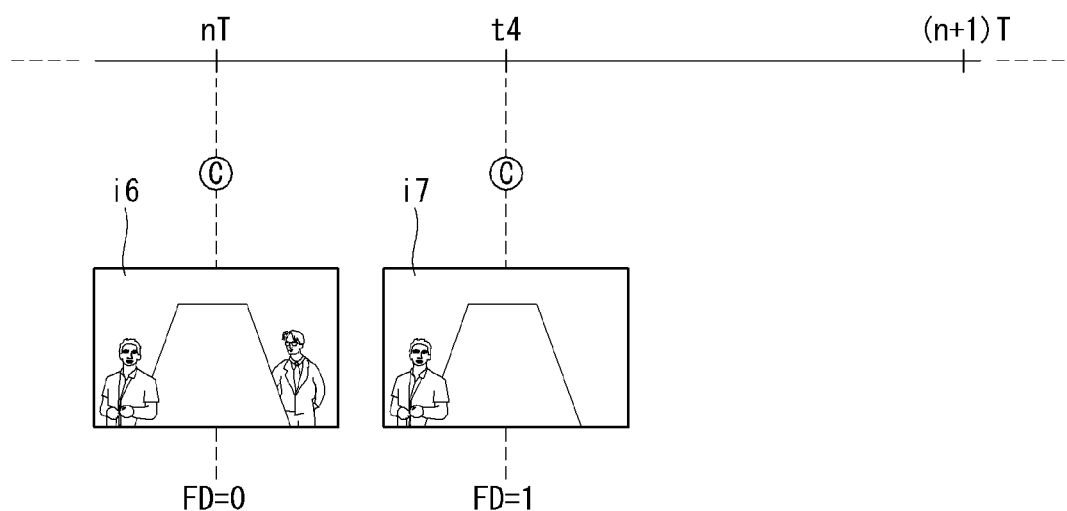
Figure 14:
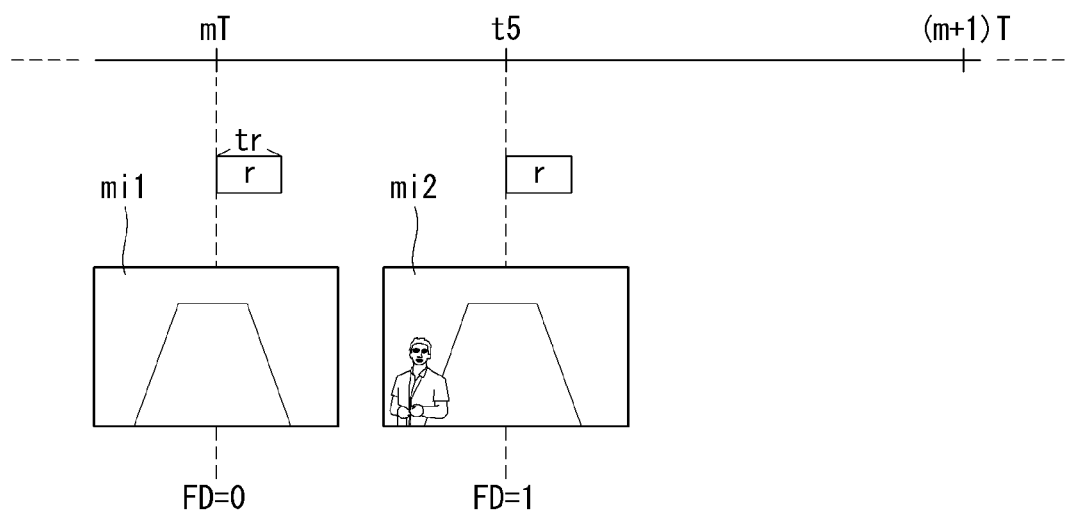

FIG. 11 is a flow diagram of a method for taking an image in the Always on Camera mode according to the one embodiment of the present invention. FIGS. 12 to 14 illustrate taking an image in the Always on Camera mode according to one embodiment of the present invention.

A method for taking an image in the Always on Camera mode according to one embodiment of the present invention may be implemented in the mobile terminal 100 described with reference to FIG. 1. In what follows, with reference to related drawings, a method for taking an image in the Always on Camera mode according to one embodiment of the present invention and an operation of the mobile terminal 100 to implement the method will be described in detail.

Referring to FIG. 11, when a photographing period starts in the Always on Camera mode S300, the controller 180 may take an image obtained through the camera 121, S310 and initialize the index value to zero S320.

FIG. 12 illustrates taking a picture during one photographing period T in the Always on Camera mode. When one photographing period is started in the Always on Camera mode, the controller 180 may take a picture c of the image i1 obtained through the camera 121. 'c' of FIGS. 12 and 13 indicates taking a picture.

The index FD value may be set to the number of subjects recognized in the image obtained through the camera 121. In other words, there may be only one subject, a person, in the image i2 obtained through the camera 121. In this case, the index FD may be set to one. At the start of the photographing period, the index FD may be initialized to zero irrespective of the number of subjects recognized within an image.

Again, with reference to FIG. 11, the controller 180 may determine whether the number of subjects within an image is changed S330.

The controller 180 may determine from the image obtained through the camera whether the number of subjects is increased or decreased. In what follows, for the convenience of description, it is assumed that the subject is a person, but the subject may be set to any other object rather than a person, and in this case, too, descriptions given below may be applied actually in the same manner unless the change of a subject is not against the technical principles of the present invention.

According to one embodiment, the controller 180 may always operate the camera 121 in Always on Camera mode. In this case, the controller 180 may recognize a person, who is a subject in the image obtained from the camera 121, at predetermined time intervals. The controller 180 may determine whether the number of recognized persons is changed.

Similarly, according to another embodiment, when a ToF sensor detects that a subject in front of the camera 121 moves, the controller 180 may operate the camera 121. In this case, the controller 180 may recognize a subject in the image obtained through the camera 121 and determine whether the number of recognized subjects has been changed.

Referring to FIG. 12, it is assumed that one person is added to the image obtained through the camera 121 at time t1 within one photographing period. The controller 180 may recognize a subject within the image at time t1 and determine that the number of subjects has been changed to one.

Again, referring to FIG. 11, when the number of subjects in the image has been changed S330, Yes, the controller 180 may determine whether the index value has been increased S 340.

Referring to FIG. 12, since the index value FD may be set to the number of subjects recognized in the image obtained through the camera 121, the index value FD at time t1 becomes one. Therefore, at time t1, the controller 180 may determine that the index FD has been increased from zero to one.

Again, referring to FIG. 11, when it is determined that the index value FD has been increased at time t1, S340, Yes, the controller 180 may take a picture i2, S350. When one photographing period is not completed S360, No, the controller 180 may again determine whether the number of subjects has been changed.

Referring to FIG. 12, it is assumed that at time t2 within one photographing period, another person is added in the image obtained through the camera 121. The controller 180 may recognize subjects within the image at time t2 and determine that the number of subjects has been changed to two.

Since the number of subjects within the image has been changed, the controller 180 may determine whether the index value has been increased. Referring to FIG. 12, the index value FD at time t2 becomes two. Therefore, at time t2, the controller 180 may determine that the index value FD has been increased from one to two. Since it is determined that the index value FD has been increased at time t2, the controller 180 may take a picture i3.

Referring to FIG. 12, it is assumed that at time t3 within one photographing period, one person who has existed in the image obtained through the camera 121 disappears. The controller 180 may recognize a subject within the image at time t3 and determine that the number of subjects has been changed to one.

Since the number of subjects within the image has been changed, the controller 180 may determine whether the index has been increased. Referring to FIG. 12, the index value FD at time t3 becomes one. Therefore, at time t3, the controller 180 may determine that the index value FD has been decreased from two to one. Since it is determined that the index value FD at time t3 has been decreased, the controller 180 may not take a picture i4 (a mark 'c', which indicates that a picture is taken, is not displayed at time t3 of FIG. 12).

Again, referring to FIG. 11, when one photographing period is completed S360, Yes, the controller 180 may start a new photographing period. As shown in FIG. 12, in the new photographing period T, the controller 180 may initialize the index value FD to zero. Also, the controller 180 may take a picture from the image i4 obtained through the camera 121. Before Always on Camera mode is completed, subsequent operations within one photographing period may be performed actually in the same manner as the process described in FIG. 11.

Different from the process described in FIG. 12, if the number of subjects is not changed during one photographing period S330, No, one photographing period is terminated, and a new photographing period may be started. In this case, too, the operations during one photographing period may be performed actually in the same manner as the process described in FIG. 11 until Always on Camera mode is terminated.

According to the description above, a picture may be taken when a new subject is added during one photographing period for taking a picture.

FIG. 13 illustrates a case in which a picture is taken when the number of subjects is decreased within arbitrary one photographing period nT. When one photographing period is started nT in the Always on Camera mode, the controller 180 may take c a picture from the image i6 obtained through the camera 121 at the start of the period. Since the picture is taken at the start of a photographing period, the index value FD may be initialized to zero irrespective of the number (two) of subjects recognized within the image.

Referring to FIG. 13, it is assumed that one person disappears from the image obtained through the camera 121 at the time t4 within one photographing period. The controller 180 may recognize subjects within the image at the time t4 and determine that the number of subjects has been changed to one.

Since the index value FD may be set to the number of subjects recognized from the image obtained through the camera 121, the index value FD at the time t4 becomes one. Therefore, at the time t4, the controller 180 may determine that the index value FD has increased from zero to one. Since it is determined that the index value FD has been increased at the time t4, the controller 180 may take a picture i7.

According to the description above, since the index value FD is initialized to zero when one photographing period is started, a picture which reflects a change of the number of subjects may be taken for each photographing period.

FIG. 14 illustrates a shooting a video within one photographing period mT. When one photographing period mT is started in Always on Camera mode, the controller 180 may record r a video mi1 obtained through the camera at the start of the photographing period. In the case of a video mi1, it may be recorded for a predetermined time period tr. Since a video is shot from the start of the photographing period, the index value FD may be initialized to zero irrespective of the number of subjects recognized within the image.

Referring to FIG. 14, it is assumed that one person is added in the image obtained through the camera 121 at time t5 within one photographing period. The controller 180 may recognize subjects in the image at time t5 and determine that the number of subjects has been changed to one.

Since the index value FD may be set to the number of subjects recognized from the image obtained through the camera 121, the index value FD at time t5 becomes one. Therefore, the controller 180 may determine at time t5 that the index value FD has increased from zero to one. Since it is determined that the index value FD has been increased at time t5, the controller 180 may shoot a video mi2.

Figure 15:
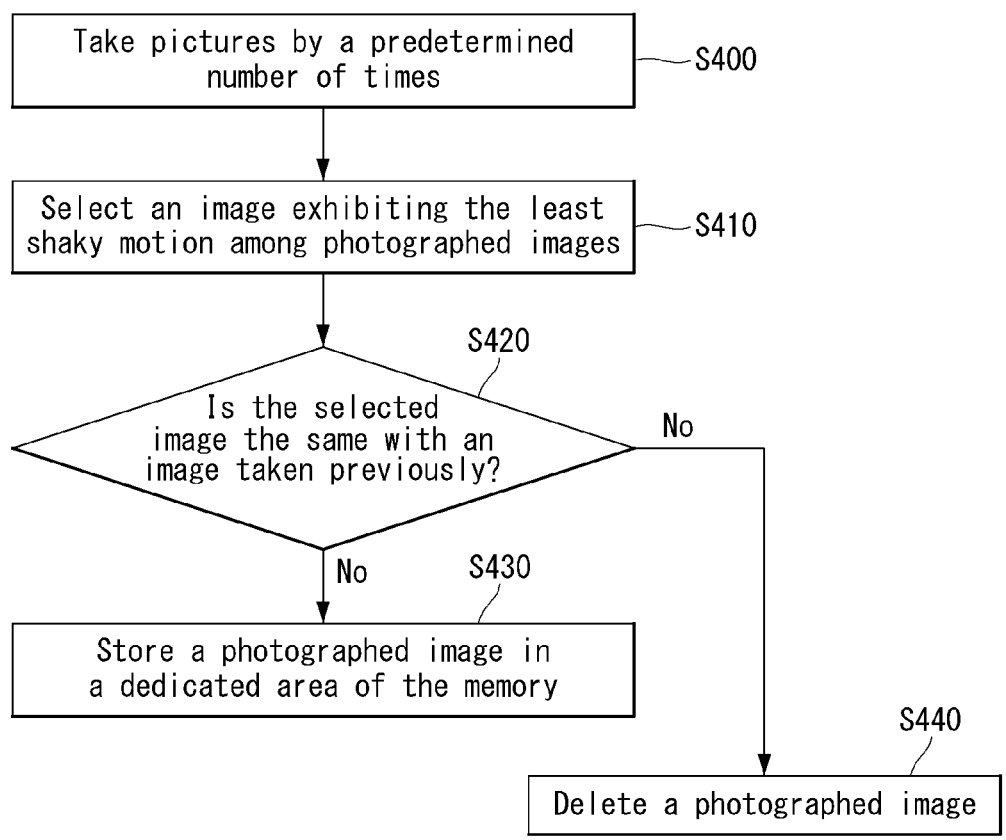
FIG. 15 is a flow diagram of a method for selecting and storing an image taken in the Always on Camera mode according to one embodiment of the present invention.
Figure 16:
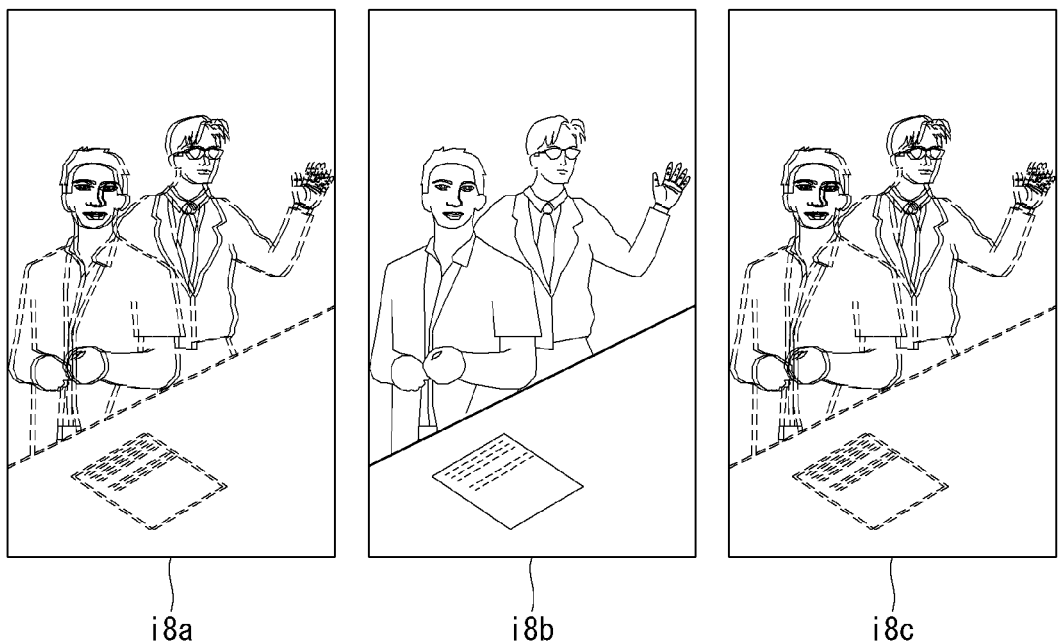
FIGS. 16 to 18 illustrate selecting an image taken in the Always on Camera mode and storing the image in a dedicated area of a memory according to one embodiment of the present invention.
Figure 17:
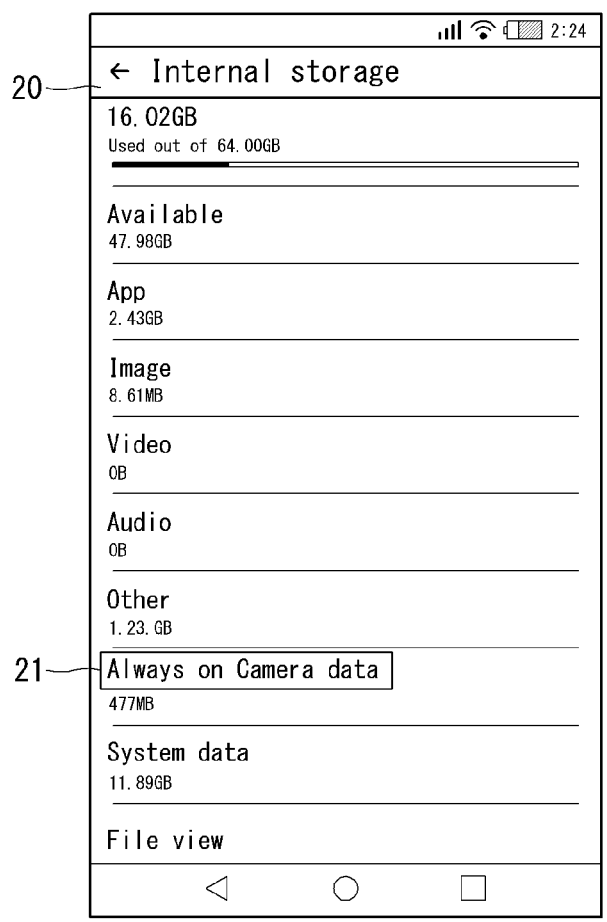
Figure 18:
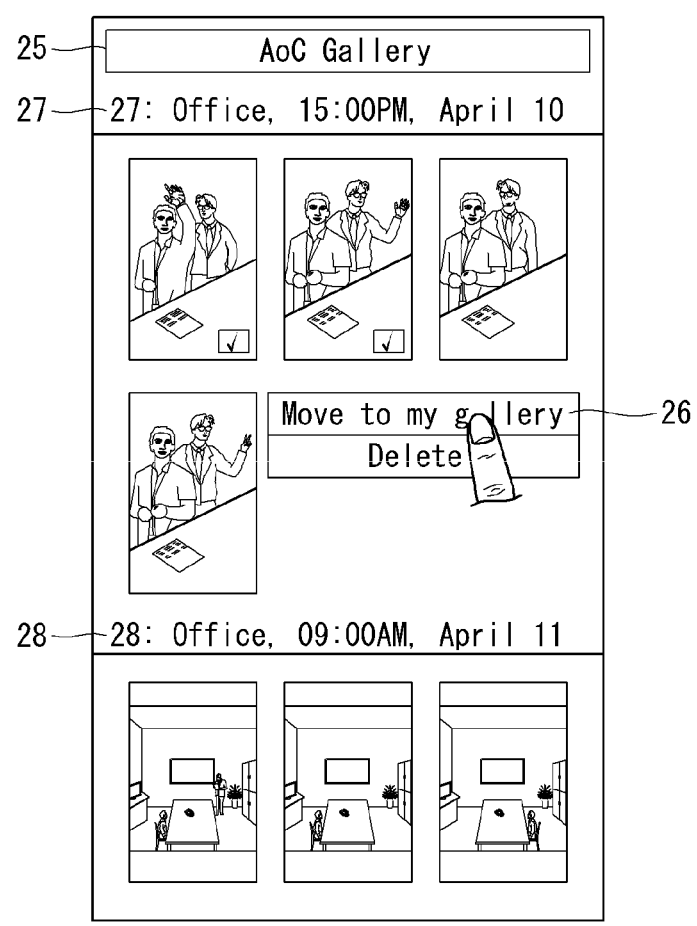

FIG. 15 is a flow diagram of a method for selecting and storing an image taken in the Always on Camera mode according to one embodiment of the present invention. FIGS. 16 to 18 illustrate selecting an image taken in the Always on Camera mode and storing the image in a dedicated area of a memory according to one embodiment of the present invention.

A control method for selecting and storing an image taken in the Always on Camera mode according to one embodiment of the present invention may be implemented in the mobile terminal 100 described with reference to FIG. 1. In what follows, with reference to related drawings, a method for selecting and storing an image taken in the Always on Camera mode according to one embodiment of the present invention and an operation of a mobile terminal 100 for implementing the method will be described in detail.

Referring to FIG. 15, the controller 180 may take pictures for a predetermined number of times when images are taken in the Always on Camera mode.

The controller 180 may take an image at the start of one photographing period, in the event of a change of subjects, and when the index value is increased. In this case, images may be taken for a predetermined number of times. For example, when the predetermined number is three, as shown in FIG. 16, three images i8a, i8b, i8c may be photographed sequentially.

Again, refereeing to FIG. 15, the controller 180 may select an image exhibiting the least shaky motion from among the pictures taken by the predetermined number of times S410.

Since no preview image is displayed on the touch screen 151 of the mobile terminal 100 while images are taken in the Always on Camera mode, people who are the subjects do not know when their images are taken. Therefore, when people who are the subjects of photographing move, their images may be photographed out of focus.

Referring to FIG. 16, it is assumed that when the predetermined number is set to three, among the three photographed images i8a, i8b, i8c, the second image i8b shows the least shaky motion. Among the three images i8a, i8b, i8c, the controller 180 takes the image i8b which shows the least shaky motion as a currently photographed image. Existence of shaky motion may be determined by any method well-known to the public without a particular limitation once the method is capable of determining existence of shaky motion within an image.

Again, referring to FIG. 15, the controller 180 may compare the selected image with an image selected from among those obtained before the selected image is taken and determine whether they are the same image S420.

For example, it is assumed that the current time is t1 of FIG. 12. Even at the time t1, the image i3 obtained through the camera 121 may be photographed by a predetermined number of times. The controller 180 may select an image showing the least shaky motion among those taken by a predetermined number of times. The controller 180 may compare the image i2 photographed at time t1 with the image i1 photographed at the start time just before the image i2 is photographed.

According to one embodiment, for comparison of two images, Gray comparison algorithm, RGB comparison algorithm, or Edge comparison algorithm may be used. However, these algorithms are only examples; the present invention is not limited to the specific algorithms, but any algorithm may be applied as long as the employed algorithm is capable of determining sameness of two images. Also, if two images are similar within a predetermined range, they may be regarded as the same image.

In the case of the two images i1, i2, since one person is added as a subject, pixel values of an area of the image i2 to which the subject has been added may exhibit large differences from those of the corresponding area of the image i1 before the subject is added. Therefore, when the two images i1, i2 are determined to be different from each other S420, No, the controller 180 may store the image i2 in a dedicated area of the memory 170, S430.

FIG. 17 shows a screen 20 in which data stored in the memory 170 of the mobile terminal 100 are displayed according to their categories. Images taken in the Always on Camera mode may be stored separately as being classified to the Always on Camera data category 21.

According to one embodiment, an Always on Camera dedicated area may be designated in the memory 170. The controller 180 may store images taken in the Always on Camera mode into the dedicated area. When the dedicated area is unable to store new images any further, the controller 180 may delete the first-stored image and store a new image.

Also, referring to FIG. 18, according to one embodiment, the images taken in the Always on Camera mode may be displayed through a separate, dedicated gallery application 25. Images may be classified and displayed on the execution screen of the dedicated gallery application 25 according to the time and place 27, 28 at which the Always on Camera mode is executed. By using a menu 26, images selected in the dedicated gallery application 25 may be moved to a gallery application in which images are displayed in an ordinary manner.

Again, referring to FIG. 25, when it is determined that the selected image is different from the image photographed just before the selected image is photographed S420, Yes, the controller 180 may not store but delete the selected image S440.

For example, it is assumed that the current time is indicated by T of FIG. 12. At time T, too, the image i5 may be obtained through the camera by a predetermined number of times. The controller 180 may select an image showing the least shaky motion among the images photographed by a predetermined number of times. The controller 180 may compare the image i5 photographed at time T with the image i4 photographed and selected at time t3 which just precedes the time T.

In the case of the two images i4, i5, since no change is observed in the person who is a subject photographed, even if the subject moves a little between the two images i4, i5, pixel values of the two images may appear to be almost the same. Therefore, when the two images i4, i5 are determined to be the same, the controller 180 may regard the image i5 as a duplicate image and delete the image.

According to the description, clear images may be photographed even when subjects move at the time of photographing. Also, duplicate images are deleted when images taken in the Always on Camera mode are stored, memory may be utilized in an efficient manner, and overuse of the memory may be prevented.

Figure 19:
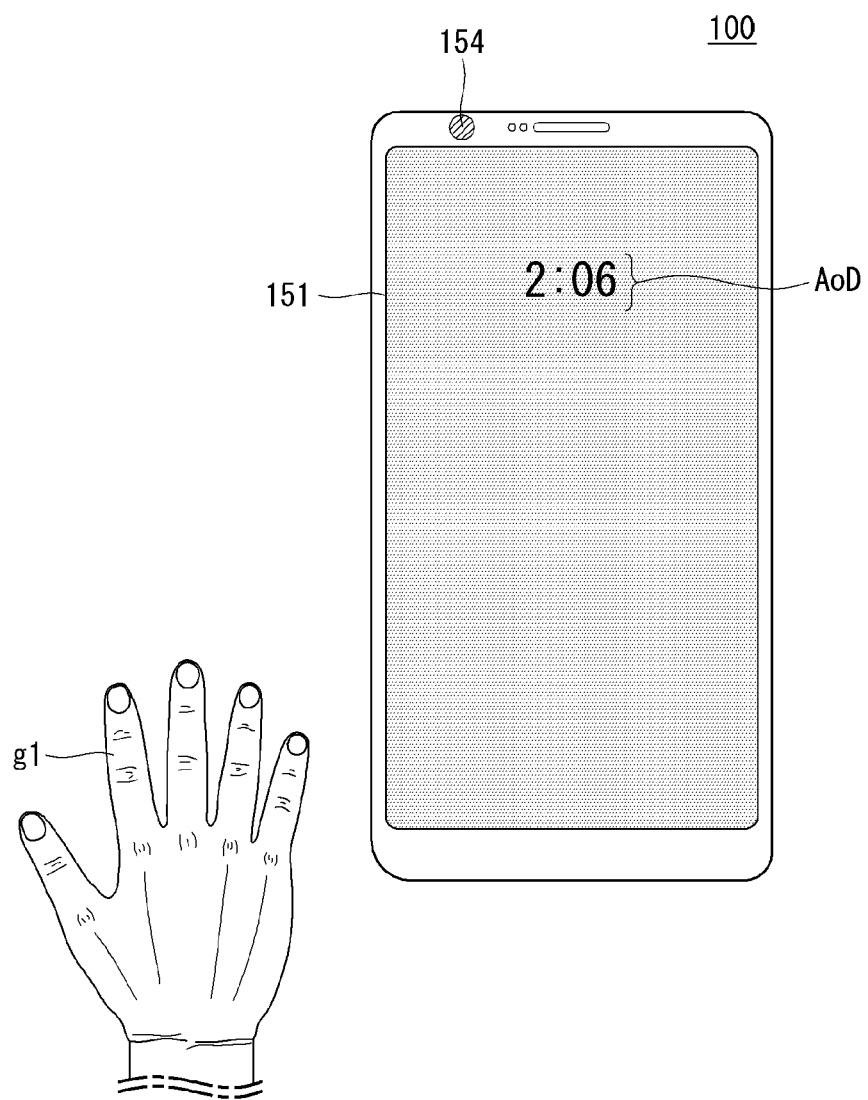
FIGS. 19 and 20 illustrate taking an image according to a gesture during operation in the Always on Camera mode according to one embodiment of the present invention.
Figure 20:
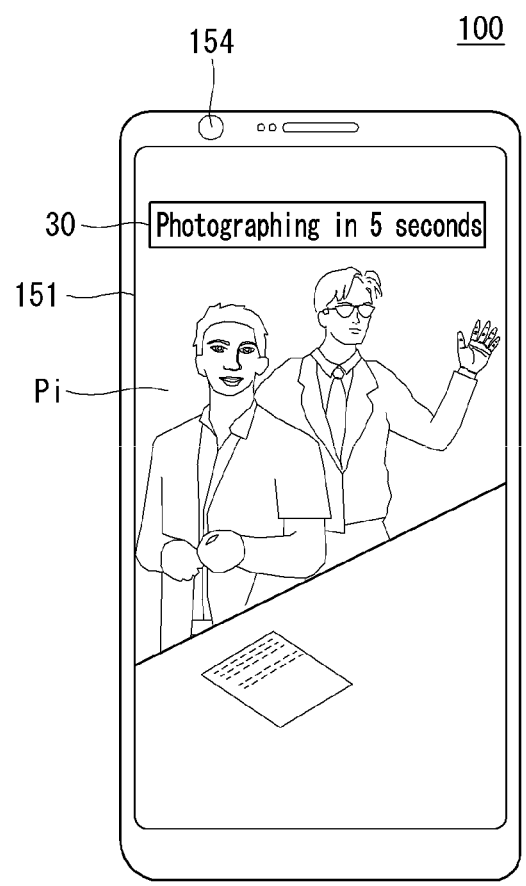

FIGS. 19 and 20 illustrate taking an image according to a gesture during operation in the Always on Camera mode according to one embodiment of the present invention.

Referring to FIG. 19, when the user wants to take a timer picture during Always on Camera mode operation, the user may take a predetermined gesture. For example, as shown in FIG. 19, the predetermined gesture may be a gesture of spreading the hand in front of the mobile terminal 100. However, the aforementioned gesture is only one example, and the present invention is not limited to the specific example.

When the predetermined gesture is detected, the controller 180 may activate the screen 151 as shown in FIG. 20. Also, the controller 180 may display a preview image Pi obtained through the camera 121 on the touch screen 151 and take a picture after a predetermined period of time. According to one embodiment, the controller 180 may display notification 30 in one area of the touch screen 151, indicating that a timer is operating.

After taking the picture, the controller 180 may deactivate the touch screen 151 again. The mobile terminal 100 may resume operation in the Always on Camera mode.

According to the embodiment, even in the middle of Always on Camera mode operation, the user may take a desired picture conveniently by using only a simple gesture.

Figure 21:
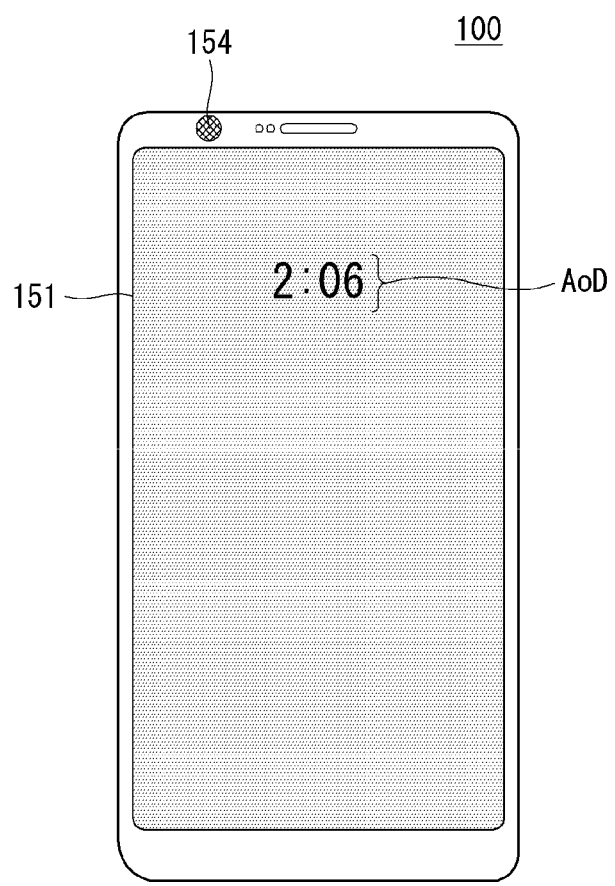
FIG. 21 illustrates an Always on Camera mode recommendation function according to one embodiment of the present invention.

FIG. 21 illustrates an Always on Camera mode recommendation function according to one embodiment of the present invention.

According to one example, the controller 180 may recommend Always on Camera mode on the basis of a photographing pattern of the user. The controller 180 may obtain the position of the mobile terminal 100 through a location information module 115 included in the wireless communication unit 110. If obtained location information is found to be a new position not obtained before, the controller 180 may recommend Always on Camera mode.

As shown in FIG. 21, the controller 180 may output a predetermined color for recommending Always on Camera mode through the optical output unit 154. According to one example, the predetermined color may be different from a predetermined color indicating that the mobile terminal is operating in Always on Camera mode as described with reference to FIG. 9.

According to another example, the photographing pattern may include locations where the user frequently uses Always on Camera mode. If an obtained location of the mobile terminal 100 is the one where Always on Camera mode has been used more than a predetermined number of times, the controller 180 may output a predetermined color which recommends the Always on Camera mode through the optical output unit 154.

The photographing pattern may include scheduling information of the user stored in the mobile terminal 100. For example, if a meeting or a gathering schedule suitable for photographing in Always on Camera mode is registered in the schedule information, the controller 180 may output the predetermined color before or after the schedule.

The aforementioned photographing patterns are only an example, and in addition to the aforementioned photographing patterns, various photographing patterns for recommending Always on Camera mode may be stored in the memory 170. When information obtained through various types of sensors installed in the mobile terminal 100 matches a stored photographing pattern, the controller 180 may output the predetermined color through the optical output unit 154.

According to the description above, the user may conveniently receive recommendations for places appropriate for taking an image in the Always on Camera mode.

Figure 22:
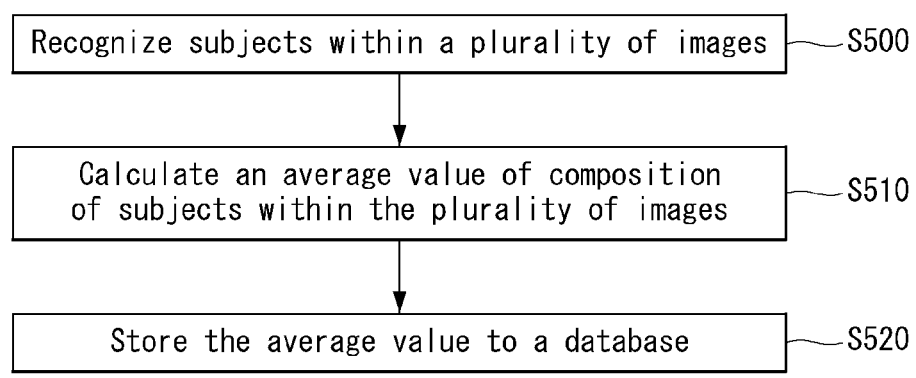
FIG. 22 is a flow diagram of a method for storing an average value of compositions of subjects within images into a database according to one embodiment of the present invention.

FIG. 22 is a flow diagram of a method for storing an average value of compositions of subjects within images into a database according to one embodiment of the present invention.

A method for storing an average value of compositions of subjects within images into a database according to one embodiment of the present invention may be implemented in the mobile terminal 100 described with reference to FIG. 1. In what follows, with reference to related drawings, a method for controlling a mobile terminal according to one embodiment of the present invention and an operation of the mobile terminal 100 for implementing the method will be described in detail.

Referring to FIG. 22, the controller 180 may recognize subjects within a plurality of images photographed by the user S500.

A plurality of images photographed by the user may be stored in the memory 170 of the mobile terminal 100. The image photographed by the user may refer to an image taken by the user rather than the image taken automatically in the Always on Camera mode. In other words, the image photographed by the user may be an image for which the user selects position, composition, and emotion of a subject within the image.

The controller 180 may recognize persons or objects which are subjects in the plurality of images stored in the memory 170. To this end, various algorithms for recognizing faces in images or extracting objects from the images may be used without restriction.

The controller 180 may calculate an average value of compositions of subjects within a plurality of images S510 and store the calculated average value into the database of the memory 170, S520.

The controller 180 may obtain data for composition of subjects recognized within the plurality of images. According to one example, the controller 180 may classify the plurality of images into categories of user's selfie images, portrait images, and object images, respectively. The controller 180 may obtain data about the composition of subjects according to individual categories and store the obtained data into the memory 170.

According to one example, the composition of a subject may correspond to a pitch, roll, and yaw angle of the subject in an image. Also, if the subject is a person, pupil position of the person's face may be included in the composition of the subject.

If the number of data describing compositions of obtained subjects exceeds a predetermined threshold, the controller 180 may calculate an average value of the compositions of the subjects. The controller 180 may divide pitch, roll, and yaw angles of obtained subjects into the individual categories and calculate average values for the respective categories.

The controller 180 may store the calculated average values of the subjects into a database of the memory 170. The controller 180 may continuously perform the aforementioned process of calculating an average value in the same manner for those images taken subsequently by the user. By reflecting a newly calculated average value, the controller 180 may update the database.

According to one example, by taking into account an image use pattern of the user, the controller 180 may update average values stored in the database. For example, in the case of an image designated as a favorite by the user, the database may be updated by weighting the composition of a subject in the corresponding image. Also, for an image uploaded to a social network service by the user, the database may be updated by weighting the image.

Up to this point, storing composition data of subjects within an image into a database has been described; however, the present invention is not limited to the specific description. According to one example, various types of data such as data of an image area in which a subject is located or data about emotion of a person who is a subject of an image may be stored together in the database. In what follows, image recommendation using the database will be described.

Figure 23:
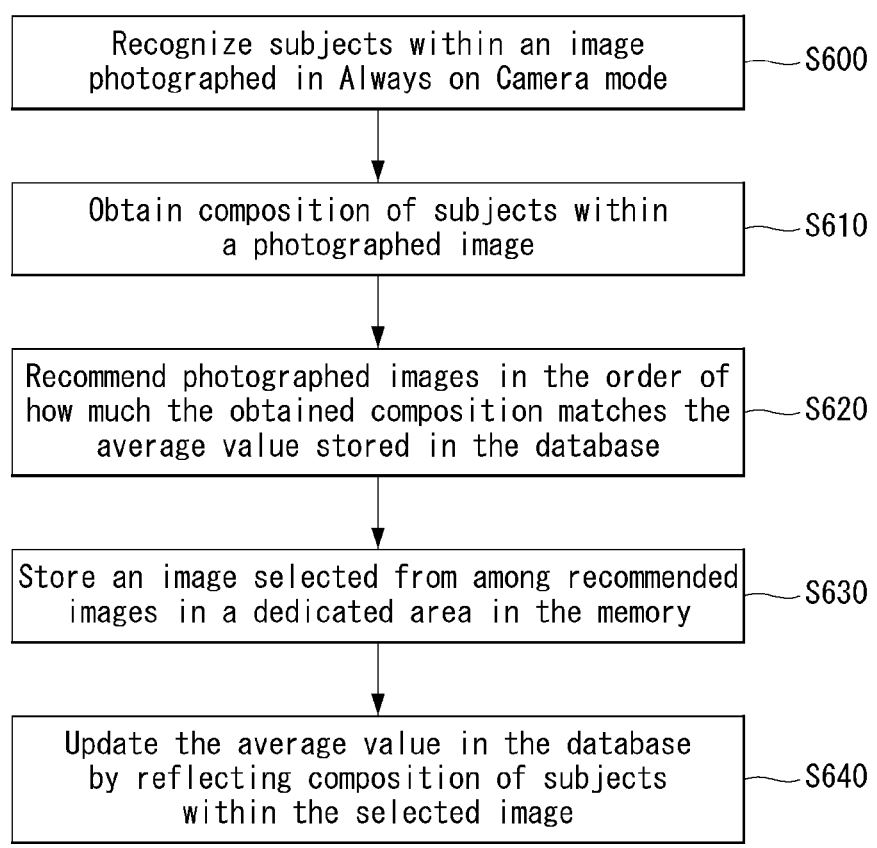
FIG. 23 is a flow diagram of a method for recommending an image from recommended images photographed in the Always on Camera mode and storing a selected image according to one embodiment of the present invention.

FIG. 23 is a flow diagram of a method for recommending an image from recommended images photographed in the Always on Camera mode and storing a selected image according to one embodiment of the present invention.

FIGS. 24 to 30 illustrate recommending an image from recommended images photographed in the Always on Camera mode and storing a selected image according to one embodiment of the present invention.

Referring to FIG. 23, the controller 180 may recognize a subject within an image photographed in the Always on Camera mode S600 and obtain composition of the subject within the photographed image S610.

According to one example, the controller 180 may recognize persons or objects which are subjects in an image photographed in the Always on Camera mode. To this end, various algorithms for recognizing faces in an image or extracting objects from the image may be used without restriction.

The controller 180 may obtain data for composition of subjects recognized within the image. According to one example, the controller 180 may obtain data about the composition of subjects by classifying the image into one of categories of user's selfie images, portrait images, and object images.

According to one example, the composition of a subject may correspond to a pitch, roll, and yaw angle of the subject in an image. Also, if the subject is a person, pupil position of the person's face may be included in the composition of the subject.

Again, referring to FIG. 23, the controller 180 may recommend the photographed image in the order of how much the obtained composition matches the average value stored in the database S620.

Figure 24:
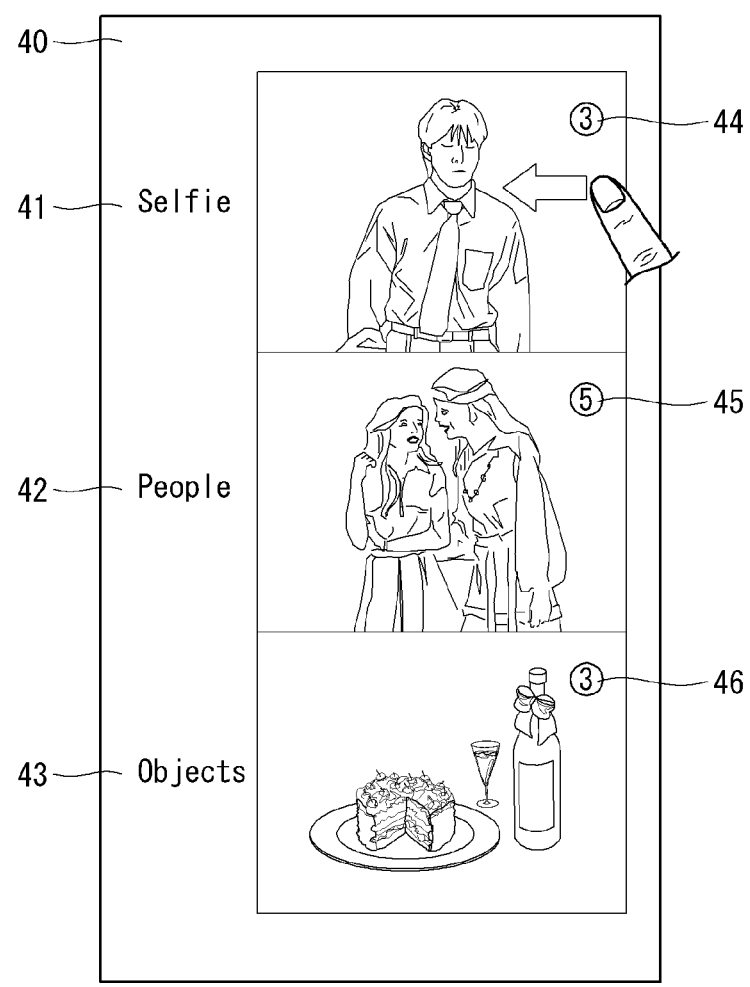
FIGS. 24 to 30 illustrate recommending an image from recommended images photographed in the Always on Camera mode and storing a selected image according to one embodiment of the present invention.

Referring to FIG. 24, the controller 180 may display a screen 40 recommending images taken in the Always on Camera mode. According to one example, acquisition of data about the composition of subjects and recommendation of images may be performed at a predetermined time. For example, at a specific time of a predetermined specific day of the week, recommendations for images taken in the Always on Camera mode during the previous week may be performed.

When the specific time is come, the controller 180 may display the screen 40 on the touch screen 151. According to one example, the controller 180 may display the screen 40 in the Always on Display state.

However, the description above is only one example, and the present invention is not limited to the specific description. According to another example, recommendation of the image may be performed each time photographing an image is completed in the Always on Camera mode.

The controller 180 may divide images photographed in the Always on Camera mode into individual categories and display the images according to the respective categories on the screen 40. As shown in FIG. 24, the screen 40 may include a selfie image category 41, portrait image category 42, and object image category 43. In each category area, the number of images 44, 45, 46 belonging to the corresponding category may be displayed. For example, the selfie image category 41 has a total of three images 44.

The controller 180 may compare the composition of subjects obtained from images in each category with an average value stored in the database described with reference to FIG. 22. For example, composition of subjects within the three images belonging to the selfie image category 41 may be compared with each average value. The controller 180 may compare the pitch, roll, and yaw angle of a subject or pupil position of the subject with an average value of the corresponding element.

The controller 180 may display the image which most matches the average value of each element first in the selfie image category area 41. As shown in FIG. 24, if a flick touch input is applied to the selfie image category area 41, the controller 180 may display an image which second matches the average value of each element in the selfie image category area 41. In the same manner, if the same flick touch input is applied, the image which least matches the average value among the three images may be displayed.

Again, referring to FIG. 23, the controller 180 may store an image selected from the recommended images in a dedicated area set in the memory S630.

Figure 25:
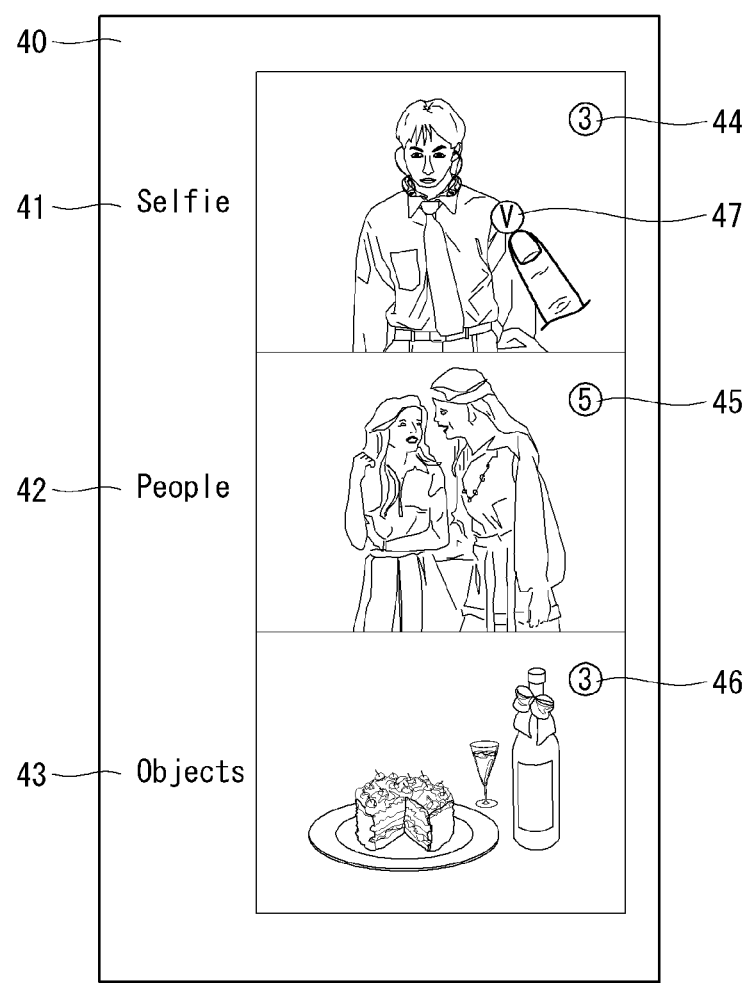

Referring to FIG. 25, the user may select an image to be stored from each category 41, 42, 43. According to one embodiment, the controller 180 may display an indicator 47 on the selected image indicating that the corresponding image has been selected.

Figure 26:
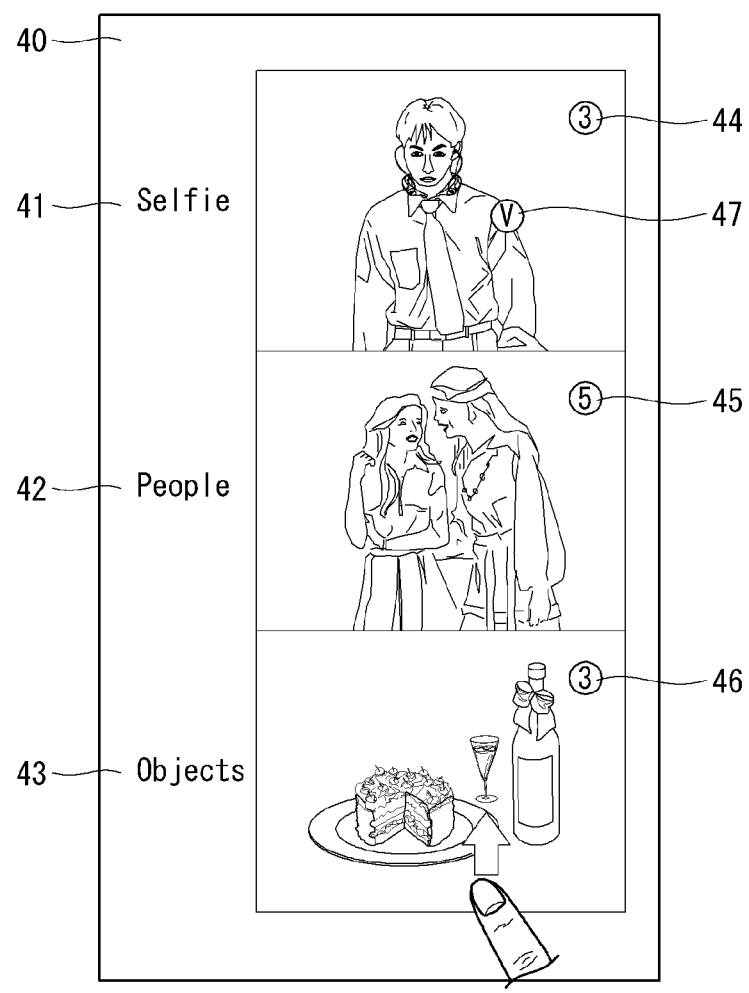

Referring to FIG. 26, if a predetermined touch input is applied while the screen 40 is displayed, the controller 180 may store the selected image in a dedicated area of the memory 170. According to one example, the predetermined touch input may be a flick touch input swiping down the screen 40. However, the description above is only one example, and the present invention is not limited to the specific example. The predetermined touch input may be implemented in various ways by using a short touch, long touch, multi-touch, drag touch, and flick touch input or a combination thereof.

According to one example, if there is a category in the screen 40, from which no image is selected, the controller 180 may automatically select an image with a high recommendation rank among the images belonging to the corresponding category. In this case, the number of automatically selected images may be predetermined. Together with the selected image, the controller 180 may store an automatically selected image in the dedicated area.

Figure 27:
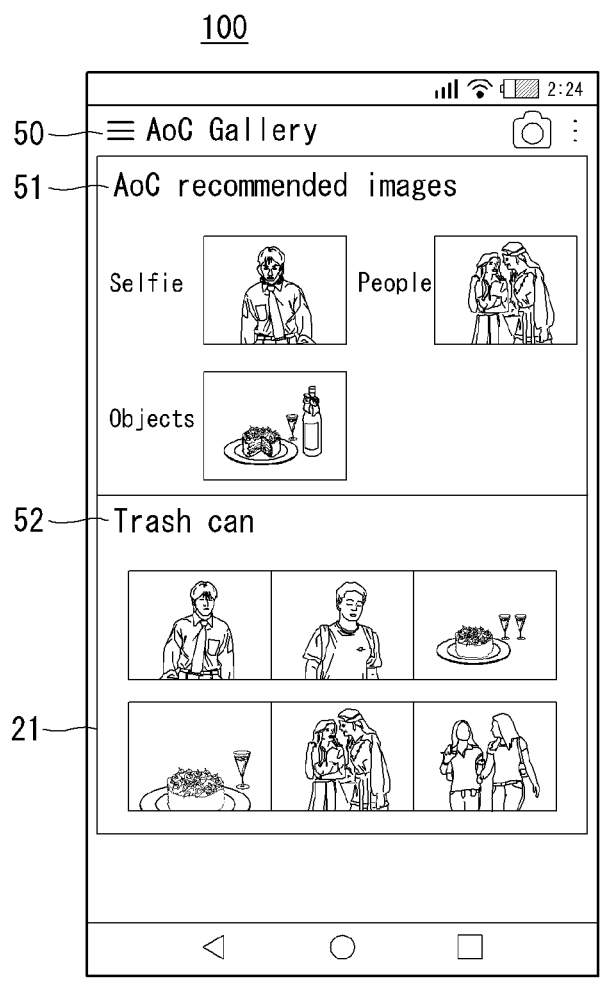

Referring to FIG. 27, according to one example, the selected images may be displayed through a gallery application dedicated for Always on Camera 50. The execution screen of the dedicated gallery application 50 may include an area 51 displaying selected recommended images and an area 52 displaying images not selected.

According to one example, the images not selected may be automatically deleted from the dedicated area after a predetermined period of time.

Again, referring to FIG. 23, the controller 180 may update the average value of the database by reflecting the composition of subjects within the selected image S640.

According to one example, the controller 180 may update the database by reflecting the image selected by the user among the recommended images. For example, the controller 180 may update the database by weighting the composition of subjects within the image selected by the user.

Also, the controller 180 may update the database by weighting an image set as a favorite by the user among the images photographed in the Always on Camera mode or an image uploaded to a social network service.

Up to this point, the present invention has been described with respect to composition data of subjects within an image, but the present invention is not limited to the description above. According to one example, the description given above may be applied actually in the same way for various types of data such as data for an image area in which a subject is located or emotion data of a person who is a subject of an image.

Figure 28:
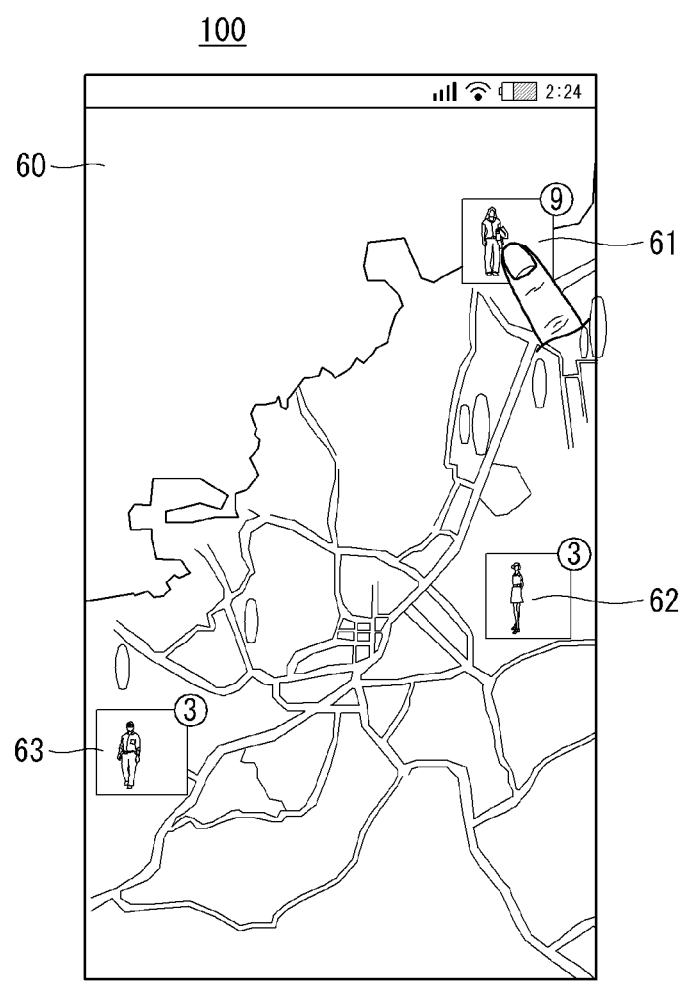

Referring to FIG. 28, a screen 60 recommending an image photographed in Always on Camera mode according to another embodiment of the present invention is illustrated. According to one example, when a predetermined event occurs, the controller 180 may display the screen 60 on the touch screen 151. According to one embodiment, the controller 180 may display the screen 60 in the Always on Camera state.

The predetermined event may include a case in which the mobile terminal 100 moves to a specific area. The controller 180 may display a map of the specific area on the screen 60 and display thumbnails 61, 62, 63 of recommended images at the positions on the map corresponding to the locations at which the images have been photographed in the Always on Camera mode. According to one example, together with the thumbnails 61, 62, 63, the number of images photographed at the corresponding locations may be displayed.

When a specific thumbnail 61 is selected, the controller 180 may display a screen 65 including an image photographed at the corresponding location. The controller 180 may compare the composition of subjects obtained from the images included in the screen 65 with an average value stored in the database described with reference to FIG. 22. In this case, the composition may be compared with the average value of each category to which the images belong (selfie images, portrait images, or object images).

The controller 180 may display images from the left to the right of the screen 65 in the order of matching scores to the average value of each element. According to one example, as shown in FIG. 29, the controller 180 may display images according to their categories in the respective rows.

Figure 29:
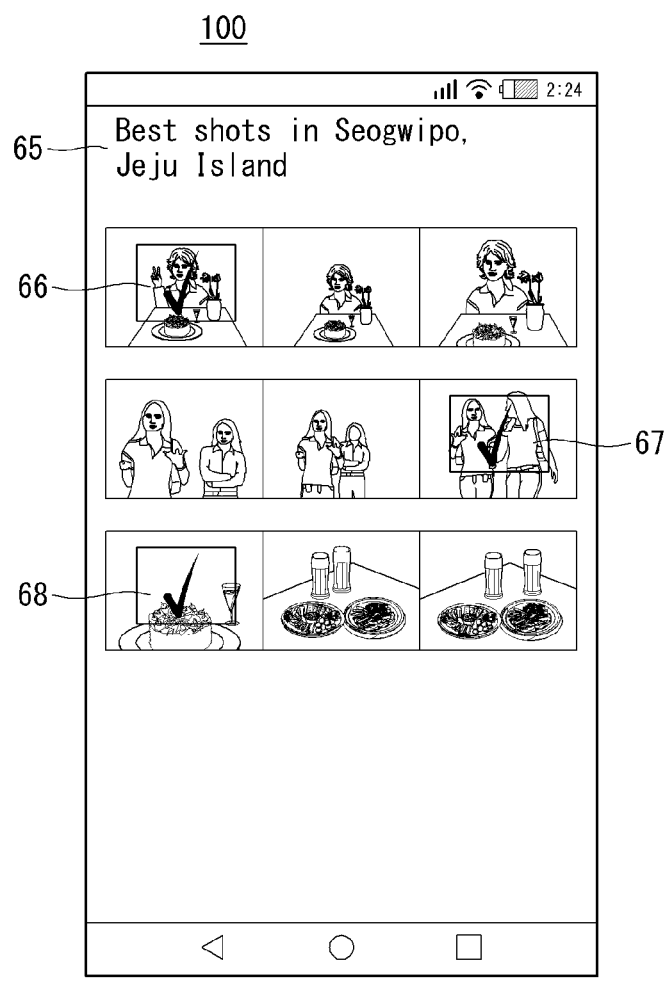

Referring to FIG. 29, the user may select an image to be stored from the screen 65. According to one example, the controller 180 may display an indicator 66, 67, 68 on the selected image indicating that the corresponding image has been selected.

As described with reference to FIG. 26, when a predetermined touch input is applied while the screen 65 is displayed, the controller 180 may store a selected image in a dedicated area of the memory 170. If there is a category in the screen 65, from which no image is selected, the controller 180 may automatically select an image displayed in the left for each category. In this case, the number of automatically selected images may be predetermined. Together with the selected image, the controller 180 may store automatically selected images in the dedicated area.

Figure 30:
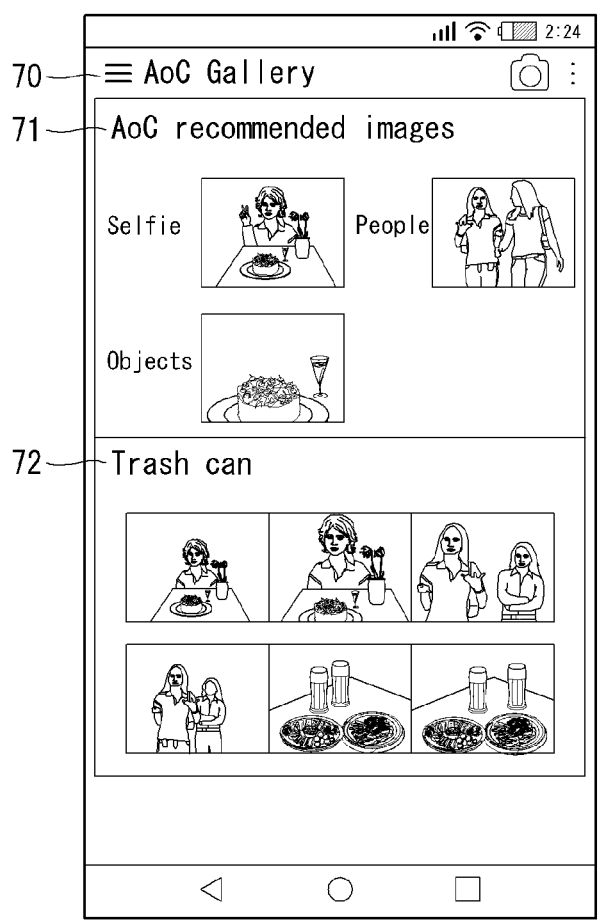

Referring to FIG. 30, according to one example, the selected images may be displayed through a gallery application dedicated for Always on Camera 70. The execution screen of the dedicated gallery application 70 may include an area 71 displaying selected recommended images and an area 72 displaying images not selected.

According to one example, the images not selected may be automatically deleted from the dedicated area after a predetermined period of time.

According to the present invention, an image suitable for a user among images photographed in the Always on Camera mode may be recommended conveniently on the basis of a database of composition of subjects within images.

Also, user preferences for images photographed in the Always on Camera mode may be easily reflected in the database.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a camera;
   a touch screen;
   a memory storing a plurality of images taken by the camera; and
   a controller configured to enter an Always on Camera mode in which the camera is operated while the touch screen is inactive and control the camera to take a picture at predetermined photographing intervals and take more pictures each time a number of recognized subjects is changed within one photographing period,
   wherein the controller is configured to:
   recognize subjects within the plurality of images and an image photographed in the Always on Camera mode,
   classify the plurality of images into categories of user's selfie images, portrait images, and object images, respectively,
   obtain data about composition of the subjects within the plurality of images and the photographed image according to individual categories,
   calculate an average value of the composition of the subjects within the plurality of images and the photographed image,
   store the obtained data and the average value in a database in the memory,
   recommend the photographed image in an order of how much the obtained composition matches the average value of the database,
   store an image selected among recommended images in a dedicated area of the memory, and
   update the average value in the database by reflecting a composition of subjects within the selected image,
   wherein the composition of the subjects includes:
   a pitch, roll, and yaw angle of the subjects; and
   a pupil position of a person's face when the subject is a person, and
   wherein the controller is further configured to divide the pitch, roll, and yaw angles of subjects into the individual categories, and calculate average values of the composition of the subjects for the respective categories.

2. The mobile terminal of claim 1, wherein the controller is configured to set a number of recognized subjects in an image as an index, initialize the index each time the one period is started, and take more pictures when the number of recognized subjects within the one photographing period is changed and the index is increased.

3. The mobile terminal of claim 1, further comprising:
   a user input unit,
   wherein, when a predetermined input is received through the user input unit, the controller is configured to activate a screen of the touch screen and display an image obtained through the camera on the screen as a preview image.

4. The mobile terminal of claim 1, further comprising:
   a sensing unit sensing a motion of the mobile terminal,
   wherein, when a predetermined input is received while the mobile terminal is stationary, the controller is configured to enter the Always on Camera mode and when the motion of the mobile terminal is sensed, the controller is configured to stop the Always on Camera mode.

5. The mobile terminal of claim 1, further comprising: an optical output unit,
wherein, when the mobile terminal enters the Always on Camera mode, the controller is configured to display a predetermined color indicating that the mobile terminal is operating in the Always on Camera mode through the optical output unit.

6. The mobile terminal of claim 1, wherein the controller is configured to take a predetermined number of images continuously at one time and select an image exhibiting the least shaky motion from among the images taken by the predetermined number of times.

7. The mobile terminal of claim 6, wherein the controller is configured to compare the selected image with an image selected from among those obtained before the selected image is taken and if the two images are different from each other, store the selected image in a dedicated area of the memory.

8. The mobile terminal of claim 1, wherein, when a predetermined gesture is detected, the controller is configured to activate the screen, display a preview image obtained through the camera on the screen, photograph an image after a predetermined time period is passed, and deactivate the screen again.

9. The mobile terminal of claim 1, wherein the controller is configured to output an alarm indicating that the mobile terminal is capable of operating in the Always on Camera mode on the basis of a position of the mobile terminal and a photographing pattern of the user.

10. A method for controlling a mobile terminal, comprising:
entering an Always on Camera mode in which a camera is operated while a touch screen is inactive;
taking, via the camera, an image at predetermined photographing intervals;
taking, via the camera, more images each time a number of recognized subjects is changed within one photographing period;
recognizing, via a controller, subjects within a plurality of images stored in a memory and an image photographed in the Always on Camera mode;
classifying, via the controller, the plurality of images into categories of user's selfie images, portrait images, and object images, respectively;
obtaining, via the controller, data about a composition of the subjects within the plurality of images and the photographed image according to individual categories;
calculating, via the controller, an average value of the composition of the subjects within the plurality of images and the photographed image;
storing the obtained data and the average value in a database in the memory;
recommending, via the controller, the photographed image in an order of how much the obtained composition matches the average value in the database;
storing an image selected among recommended images in a dedicated area of the memory; and
updating, via the controller, the average value of the database by reflecting a composition of subjects within the selected image,
wherein the composition of the subjects includes:
a pitch, roll, and yaw angle of the subjects; and
a pupil position of a person's face when the subject is a person, and
wherein the calculating the average value of the composition of the subjects within the plurality of images and the photographed image further comprises:
dividing the pitch, roll, and yaw angles of obtained subjects into the individual categories; and
calculating average values of the composition of the subjects for the respective categories.

* * * * *